(12) United States Patent
Topolovac et al.

(10) Patent No.: US 7,610,312 B1
(45) Date of Patent: *Oct. 27, 2009

(54) SYSTEM AND METHOD FOR MANAGING DATA IN MULTIPLE BILLS OF MATERIAL OVER A NETWORK

(75) Inventors: Michael Topolovac, Palo Alto, CA (US); Eric Larkin, San Jose, CA (US); Janet Yu, San Francisco, CA (US)

(73) Assignee: Arena Solutions, Inc., Foster City, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/750,254

(22) Filed: May 17, 2007

Related U.S. Application Data

(63) Continuation of application No. 09/832,753, filed on Apr. 10, 2001, now abandoned.

(60) Provisional application No. 60/195,918, filed on Apr. 10, 2000, provisional application No. 60/206,219, filed on May 22, 2000, provisional application No. 60/206,221, filed on May 22, 2000, provisional application No. 60/210,935, filed on Jun. 12, 2000.

(51) Int. Cl.
*G06F 7/00* (2006.01)
*G06F 7/10* (2006.01)
*G06F 17/00* (2006.01)
*G06F 17/30* (2006.01)
*G06F 17/40* (2006.01)

(52) U.S. Cl. .................. 707/104.1; 707/1; 707/9; 707/100; 707/102

(58) Field of Classification Search .......... 707/1, 707/9, 100, 102, 104.1
See application file for complete search history.

(56) References Cited

U.S. PATENT DOCUMENTS

| | | | |
|---|---|---|---|
| 4,875,162 A | 10/1989 | Ferriter et al. | 364/401 |
| 5,493,679 A | 2/1996 | Virgil et al. | 395/600 |
| 5,655,087 A | 8/1997 | Hino et al. | 395/229 |
| 5,740,425 A | 4/1998 | Povilus | 395/611 |
| 5,826,265 A | 10/1998 | Van Huben et al. | 707/8 |
| 5,918,228 A | 6/1999 | Rich et al. | 707/10 |

(Continued)

OTHER PUBLICATIONS

Blaha et al., Bill-of-Material Configuration Generation, Data Engineering, 1990. Proceedings. Sixth International Conference on Feb. 5-9, 1990, pp. 237-244.

(Continued)

*Primary Examiner*—James Trujillo
*Assistant Examiner*—William Spieler
(74) *Attorney, Agent, or Firm*—Dov Rosenfeld; Inventek

(57) ABSTRACT

A system for managing a bill of materials includes a data structure having at least one record with a primary key data field, an owner data field for indicating the owner of the record, the owner data field including data representative of one of a plurality of owners, and at least one other data field. In another aspect, the system for managing a bill of materials includes a database having a single namespace, and at least one record with a primary key data field, an owner data field for indicating the owner of the record, the owner data field including data representative of one of a plurality of owners, and at least one other data field.

17 Claims, 14 Drawing Sheets

U.S. PATENT DOCUMENTS

| | | | |
|---|---|---|---|
| 5,937,160 A | 8/1999 | Davis et al. | 395/200.33 |
| 6,058,399 A | 5/2000 | Morag et al. | 707/201 |
| 6,092,189 A | 7/2000 | Fisher et al. | 713/1 |
| 6,167,406 A | 12/2000 | Hoskins et al. | 707/102 |
| 6,208,995 B1 | 3/2001 | Himmel et al. | 707/104 |
| 6,256,596 B1 | 7/2001 | Leite, Jr. et al. | 703/2 |
| 6,311,207 B1 | 10/2001 | Mighdoll et al. | 709/203 |
| 6,339,767 B1 * | 1/2002 | Rivette et al. | 707/2 |
| 6,434,607 B1 | 8/2002 | Haverstock et al. | 709/217 |
| 6,438,549 B1 | 8/2002 | Aldred et al. | 707/9 |
| 6,446,069 B1 | 9/2002 | Yuang et al. | 707/9 |
| 6,505,205 B1 | 1/2003 | Kothuri et al. | 707/100 |
| 6,609,108 B1 | 8/2003 | Pulliam et al. | 705/27 |
| 6,622,149 B1 | 9/2003 | Kellstrom, Jr. | 707/104.1 |
| 6,651,072 B1 | 11/2003 | Carino, Jr. et al. | 707/104 |
| 6,741,980 B1 | 5/2004 | Langseth et al. | 707/2 |
| 6,983,278 B1 | 1/2006 | Yu et al. | 707/9 |
| 7,010,580 B1 | 3/2006 | Fu et al. | 709/217 |
| 2001/0056436 A1 | 12/2001 | Stejskal et al. | 707/200 |
| 2002/0007293 A1 | 1/2002 | Clemens et al. | 705/7 |
| 2002/0007348 A1 | 1/2002 | Ali et al. | 705/51 |
| 2002/0023109 A1 | 2/2002 | Lederer, Jr. et al. | 707/511 |
| 2002/0194178 A1 * | 12/2002 | Gilmour et al. | 707/9 |
| 2003/0163329 A1 | 8/2003 | Bolene | 705/1 |
| 2004/0049294 A1 * | 3/2004 | Keene et al. | 700/5 |

OTHER PUBLICATIONS

Olen set al., A Procedure-Oriented Generic Bill of Materials, Computers & Industrial Engineering, vol. 32, Issue 1, Jan. 1997, abstract.
Wolfram WoB, "A Rule-driven Generator for Variant Parts and Variant Bills of Material," Database and Expert Systems Applications, 1997, Proceedings, Eight International Workshop on, Sep. 1-2, 1997, pp. 556-561.
Brochure: Agile Hosting Services, Agile Software Corp., Jun. 28, 2002. Available at www.agilesoft.com.
"Program Review of Eigner+Partner's axalant cPDm Program", CIMdata, Inc., Sep. 2000. Available at http://www.CIMdata.com.

* cited by examiner

SYSTEM AND METHOD FOR MANAGING DATA IN MULTIPLE BILLS OF MATERIAL OVER A NETWORK

CROSS-REFERENCE TO RELATED APPLICATIONS

This application is a continuation of U.S. patent application Ser. No. 09/832,753 filed Apr. 10, 2001 now abandoned titled SYSTEM AND METHOD FOR MANAGING DATA IN MULTIPLE BILLS OF MATERIAL OVER A NETWORK. The contents of U.S. application Ser. No. 09/832,753 are incorporated herein by reference.

U.S. application Ser. No. 09/832,753 claims priority from U.S. Provisional Application Ser. No. 60/195,918 entitled "System and Method for Hosting Multiple Bills of Material for Multiple Companies in a Single Namespace" filed Apr. 10, 2000 by Eric Larkin and Michael Topolovac; U.S. Provisional Application Ser. No. 60/206,219 entitled "System and Method for Transparent Electronic Processing" filed May 22, 2000 by Eric Larkin and Michael Topolovac; U.S. Provisional Application Ser. No. 60/206,221 entitled "System and Method for Vendor Performance Tracking" filed May 22, 2000 by Eric Larkin and Michael Topolovac; and U.S. Provisional Application Ser. No. 60/210,935 entitled "Systems and Methods for Utilizing Multiple Bills of Material from Multiple Companies Stored in a Single Namespace" filed Jun. 12, 2000 by Eric Larkin, Michael Topolovac, and Janet Yu, the disclosures of which are hereby incorporated by reference.

BACKGROUND OF THE INVENTION

1. Field of the Invention

The invention relates generally to the field of data management and more particularly to managing data related to bills of material on a computer network.

2. Description of Related Art

During development and manufacturing of a product, elements, parts or components of the product are often kept in a structured item list called a bill of materials (hereinafter BOM, while the plural form, bills of material, is abbreviated as BOMs). For each such product, a BOM is used to keep track of information such as the number of parts used in manufacturing the product, the identification of parts, part vendors, and part costs. The BOM may also be used as an index or organizational tool for the documentation of a product's components such as component datasheets and mechanical drawings. Furthermore, in some instances BOMs include non-material elements such as assembly and finishing processes, machining steps, and connections. Finally, BOMs may include reference items such as tooling or agency certifications which are not actually included in the product itself, but which are required for its manufacture.

During the product development process a BOM is typically changed frequently and considerable effort is undertaken to collect and maintain BOM data. After the development cycle is complete, the BOM may be used as a guide for purchasing, and for inventory maintenance and cost control. As such, parties involved in a wide variety of organizational tasks generally make use of BOMs.

A BOM typically has a nested or hierarchical structure. For example, a typical BOM for a very simple consumer product includes a first level item list that has the box in which the product is delivered, the packing material used to protect the product from damage during shipping, the product assembly and/or use instructions, and the product itself. The first level item list also includes non-physical reference items such as product certifications and agency approvals. In the case where the product is an assembly of components, the BOM includes a second level item list that has one or more parts of the product enclosure, fasteners, a label, and one or more printed wiring board assemblies, for example. The BOM includes a third level item list for a printed wiring board assembly that typically has the printed wiring board itself and a number of electrical components of various types in various quantities. The printed wiring board item list also includes a non-physical item representing the manufacturing process of assembling the various physical parts together onto the printed wiring board. The printed wiring board item list also includes items such as fiducials and test points that are fabricated as an integral part of the printed wiring board.

It is common to refer to a nested BOM as a multi-level BOM and to an item list for a particular assembly as a single-level BOM. BOMs are often very complex, with hundreds or thousands of items and five to ten or more levels. It is common for the same item or subassembly to appear multiple times at multiple levels in a BOM. In addition, subassemblies are often used in quantities greater than one. Both of these situations substantially complicate tracking of a total component count. For this reason, a separate single-level item list is sometimes developed that includes one line for each unique item in a BOM, each line including a total quantity of that item used in the product. The development of such an item list is referred to as the flattening of the BOM, and the resulting single-level item list is often called a flattened BOM. Flattening a BOM during product development is often done by a single individual working with a computer application program such as a spreadsheet and is a time-consuming and error-prone process. Further, when the BOM changes frequently during product development, maintaining a flattened BOM is very difficult.

As noted above, BOMs additionally serve as guides for purchasing. The inclusion of non-physical and non-purchasable elements such as fiducials and test points in a BOM can be a source of confusion when the BOM is used in this manner. Non-technical staff may spend considerable time attempting to find sources for non-physical items or for items such as test points that are produced as a by-product of another manufacturing process. For this reason, separate item lists are often developed for purchasable and non-purchasable elements in a BOM. Because the resulting item list is often used as a guide for purchasing items, it is commonly referred to as a purchasing BOM. A purchasing BOM is typically created manually during product development.

The creation of flattened and purchasing BOMs is often combined, resulting in a flattened purchasing BOM. As can be appreciated, the manual process of creating the flattened purchasing BOM is time-consuming and prone to human error.

In a typical industrial setting, a single company manufactures many products each of which requires a BOM. Each such BOM may include common parts and subassemblies. In such situations, it is desirable to maintain a master item list of the items used in the company's products and to require that all items in the company's BOMs be included in the master item list. Generally a company's master item list and the BOMs that it references are closely guarded trade secrets, as access to such information would assist a competitor in replicating the company's products. The secrecy of such information is even more critical during product development, when access by a competitor would permit the competitor to anticipate the company's future direction and future product features. Thus master item lists and BOMs are conventionally maintained on a company's computer system and not placed in a common computing environment with data from other companies. Further, multiple companies' BOM data is never stored in a single database.

While the master item list and the collection of product BOMs as a whole are generally kept secret, a company must share information about individual items including discrete parts and subassemblies with its suppliers in order to permit the suppliers to manufacture the parts and subassemblies. In cases where a company uses a contract manufacturer to produce an entire product on a turnkey basis, the company must share the entire product BOM with the contract manufacturer. Currently, information is shared with suppliers on an ad hoc basis, with individual engineers or purchasing agents mailing or e-mailing product documentation to the suppliers. As a result, suppliers frequently have out-of-date or otherwise incorrect information about items and subassemblies. This method of sharing information does not enable a company to easily determine which information each supplier has and if the release of the information is appropriate.

Various software tools have been developed to manage BOMs. Each of these tools provides limited functionality to address a specific aspect of BOM management. For example, to facilitate the manufacturing process and to plan the procurement of product components, conventional computer software called Manufacturing Resource Planning (MRP) software may be employed. MRP software uses a product BOM as the basis for such planning. However, MRP software is very complex to use. In addition, MRP software typically assumes that the product BOM changes very infrequently and as a result only provides inadequate tools for entering changes to the BOM. For these reasons, MRP software is rarely used during product development, when the product BOM may be changing on a daily or weekly basis and ease-of-use is important. Further, the calculations performed by MRP software are quite intensive and a single computer or server is typically dedicated to running the MRP software for one company or user. The computer used for this purpose is typically housed on-site at the company for security and convenience.

The most common category of software tool used for BOM management during product development is the general-purpose spreadsheet, of which Microsoft Excel® is an example. However spreadsheets are not well suited to BOM management. As noted above, a BOM is a complex collection of information that is typically developed and used by a group of people working together. Such information is more efficiently managed with a multi-user, relational database, while a spreadsheet is best characterized as a single-user flat-file database.

Examples of database applications employed to manage BOMs include Agile Anywhere® by Agile Software Corp. of San Jose, Calif. and Vendors® by Trilogy Design of Grass Valley, Calif. These applications provide a dedicated multi-user database for managing a single company's master item list and related BOM data during product development, including vendor and inventory information and item specification documents. However, these applications do not provide any means to maintain master item lists and BOM data from multiple companies or unrelated users in a single computer system or in a single database.

Furthermore, the set-up and management of dedicated computer systems for BOM management is difficult and expensive. This fact is widely recognized, as is evidenced by Agile Software's "Hosting" service. This service permits a company to pay Agile Software to maintain a dedicated BOM management database on a dedicated computer at an offsite facility with access to the database provided by secure connections over the Internet. Agile Software claims to be able to set up a customer with hosting in " . . . as little as four weeks" (Agile Hosting Datasheet, Document #DSHOST-B 06/00, Agile Software Corp.).

The hosting of data from more than one company in a single database is known in the art. For example, Yahoo! Corporation provides a service that permits companies to set up virtual storefronts or catalogs on the Internet for presentation to potential customers. These and related services allow companies to combine non-confidential catalog data into a common database managed by a third party and thereby reduce the cost of set-up and maintenance of an electronic commerce web site. A notable feature of such services is that the hosted data is considered non-confidential by the participating companies.

Known database systems further enable a contract manufacturer to combine BOM data from multiple customer companies into a single database using conventional MRP or BOM management software. As such, the contract manufacturer combined database is a BOM management database for the contract manufacturer and is established for the sole use of the contract manufacturer. In particular, the contract manufacturer is not permitted to keep track of which customer supplied which data, except through cumbersome manual tabulation and labeling of individual item and BOM relations. Furthermore, customer companies of the contract manufacturer are not generally permitted access to the combined database, as this would violate the confidentiality of other customer companies' data. In the rare situations where customer access is permitted, access privileges must be administered on an ad hoc basis by manually designating which BOM data should be available to which customer. In addition, the combined database represents a duplication of BOM data, that is, the customer maintains one representation of the product BOM on their own system, and the contract manufacturer maintains a second representation on the contract manufacturer's system.

Master item lists in current BOM management systems include only items as represented by the company that owns the system. Current BOM management systems do not permit representation of other company's items as distinct entities within the BOM management system. As a result, documents and information such as supplier datasheets are typically duplicated by customer companies and then stored and tracked under the customer company's item number. In some cases, the same supplier item may be approved for use as multiple customer items. For example, a supplier's 1% tolerance resistor may be approved for use as the customer's 1% tolerance resistor or as the customer's 5% tolerance resistor. In such a situation, the supplier's item information is replicated multiple times in the customer's BOM management system. This presents difficulties when the supplier changes the supplier item data, as each of the duplicate representations of the supplier item in the customer's BOM management system must be updated individually. Thus, there is a need for a BOM management system that permits a company to maintain representations of other companies' BOM data, including items, while minimizing the duplication of such data.

Conventional software tools further include those that provide for the analysis of BOM data and the categorization of items in a master item list. During product development and production, it is common to categorize components as line items of a BOM by type such as molded plastic part, printed circuit board, and integrated circuit and then to conduct design analysis to determine the relative number and value of each type of component contained in a particular product or group of products. A typical statement that would arise from this type of analysis is "in product X, mechanical components account for 5% of the total number of components and 25% of the overall product cost." This type of analysis is often done to direct cost-reduction efforts, both in development and in production.

Because of the recognized need to categorize components by type, developers of software tools that manage and maintain element lists and BOMs conventionally include functionality that permits component type categorization. This functionality is implemented with either a fixed "built-in" scheme for type categorization, or support for a single user-specified application-specific categorization scheme. When implemented, these solutions permit only one level of categorization, so either the developer or the user of the software tool must decide how many different categories to include, and what level of detail to include in each category type.

When the categorization scheme is specified by the software tool developer, problems arise because different users typically want different categorization schemes. For example, a manufacturer of optical equipment may need a very precise categorization of different lens types and have no need for a categorization of electrical components. Alternatively, a manufacturer of door locks would need a detailed categorization of mechanical components, but have no need to categorize lenses or electrical components.

Problems also arise when a company using the software tool can specify the categorization scheme in their implementation of the categorization. Different individual users of the system need different levels of detail in the categorization scheme. Clerks who assign item numbers typically prefer a simple system with few categories, as less technical knowledge is required to correctly categorize an element. Engineers and technical managers typically prefer a system with more categories, because this is more useful in performing design analysis. A technical manager may prefer relatively few, broad categories (for example, electrical, mechanical, packaging), while the individual engineers typically want categories that reflect a much more precise categorization. However, even different engineers typically care about different levels of detail. An electrical engineer may wish to categorize electrical components very precisely, but be happy to group all mechanical components together into one category. Conversely, a mechanical engineer may want to categorize mechanical components very precisely and not care about electrical components. Conventional systems do not have the flexibility to meet these varied preferences.

The difficulty of addressing component categorization in a way that adequately serves the needs of different companies and different users within the company is so severe that many developers of software tools that manage and maintain item lists and BOMs have chosen to omit this functionality. Furthermore, current categorization systems are inflexible and limited in their use. They do not adapt well to specific applications and are inadequate for analyzing BOMs. Current categorization systems also do not support multiple categorization levels, inheritance of category properties, and multiple views of category detail.

In sum, conventional systems do not provide for the flexibility required of BOM management systems. For example, current technology does not facilitate the sharing of information between BOMs, particularly when the BOMs are developed by different users. The lack of shared BOM data inhibits activities such as identification of vendors, rating of parts, rating of vendors, rating of manufacturers, calculation of cost estimates, identification of components and alternative components, and execution of electronic transactions. Currently, the presence of an element, and data concerning that element, in a BOM is not fully exploited when a second BOM is developed. The current technology also does not facilitate the presentation of a variety of views of a BOM or a variety of views of elements within a BOM. Finally, there are no means by which data within a BOM can be used to provide a user with additional useful information about related elements and products.

Conventional systems do not facilitate grouping of user data across separate BOMs. For example, there are no prior art systems for storing more than one BOM, owned by more than one user, in a single namespace. A single namespace includes a set of names, such as the primary keys of a database, in which all names (keys) are unique. Therefore, in the prior art it is not possible to store multiple BOMs within a single data file, or set of files that share a set of primary keys, while maintaining ownership or access control to individual BOMs, and BOM data, among the stored multiple BOMs. This prevents the storage of BOMs from multiple companies, or any other "owning" entity, in a single database or similar computational process. Advantages of BOM aggregation are therefore not achievable in the prior art.

SUMMARY OF THE INVENTION

A system for managing a bill of materials includes a data structure having at least one record with a primary key data field, an owner data field for indicating the owner of the record, the owner data field including data representative of one of a plurality of owners, and at least one other data field.

In another aspect, the system for managing a bill of materials includes a database having a single namespace, and at least one record with a primary key data field, an owner data field for indicating the owner of the record, the owner data field including data representative of one of a plurality of owners, and at least one other data field.

In another aspect, the system provides a means for storing multiple bills of material, from multiple owners in a single namespace.

The foregoing and other advantages of the invention will become apparent to those of ordinary skill in the art after having read the following detailed description as illustrated in the various drawing figures.

DETAILED DESCRIPTION OF THE INVENTION

Figure 1:
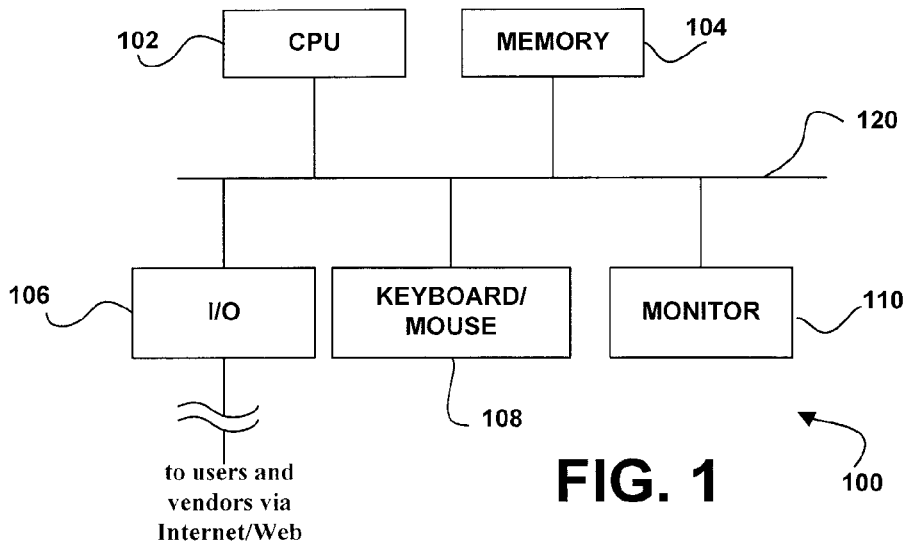
FIG. 1 illustrates a system 100 in which the invention may be practiced.

FIG. 1 illustrates a system 100 in which the invention may be practiced. System 100 includes at least one central processing unit 102, a memory 104, and an input/output (I/O) interface 106, all connected by a system bus 120. I/O interface 106 connects system 100 to users and vendors via a communications network such as the Internet, thereby allowing system 100 to exchange data with users and vendors. System 100 is alternatively connected to users and vendors via telephone lines and modems, or by any other means for sending and receiving digital data. Memory 104 includes a single read and write capable memory device, or alternatively, a system comprised of multiple memory systems such as a hard drive, RAM, ROM and/or any other memory appliances. In addition, system 100 optionally includes a keyboard/mouse 108, a monitor 110, and other peripheral devices (not shown).

Figure 2:
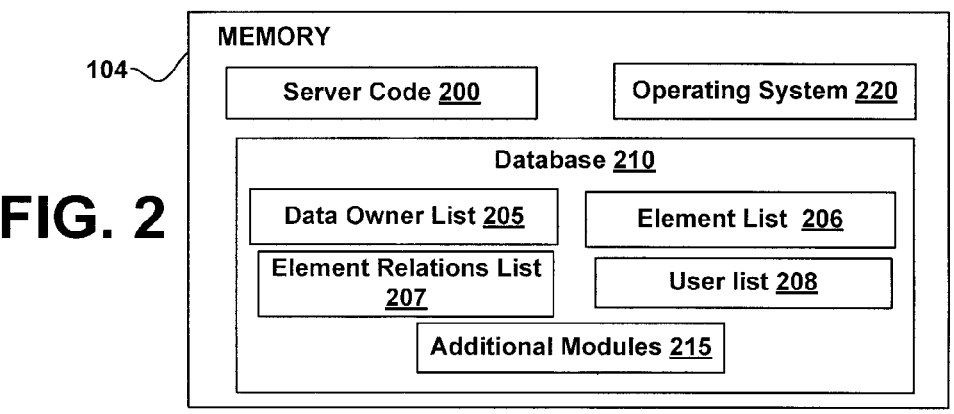
FIG. 2 illustrates system components located in memory 104.

As illustrated in FIG. 2 memory 104 includes a server code 200 and a relational database management system (RDBMS) 210. Server code 200 includes a variety of application code supporting a plurality of applications. Memory 104 also stores an operating system 220 such as Windows NT®, Linux®, or Solaris® that is capable of supporting server code 200 and RDBMS 210. RDBMS 210 includes a data owner list 205, an element list 206, and an element relations list 207. RDMBS 210 optionally includes a user list 208 and RDBMS modules 215.

Figure 3:
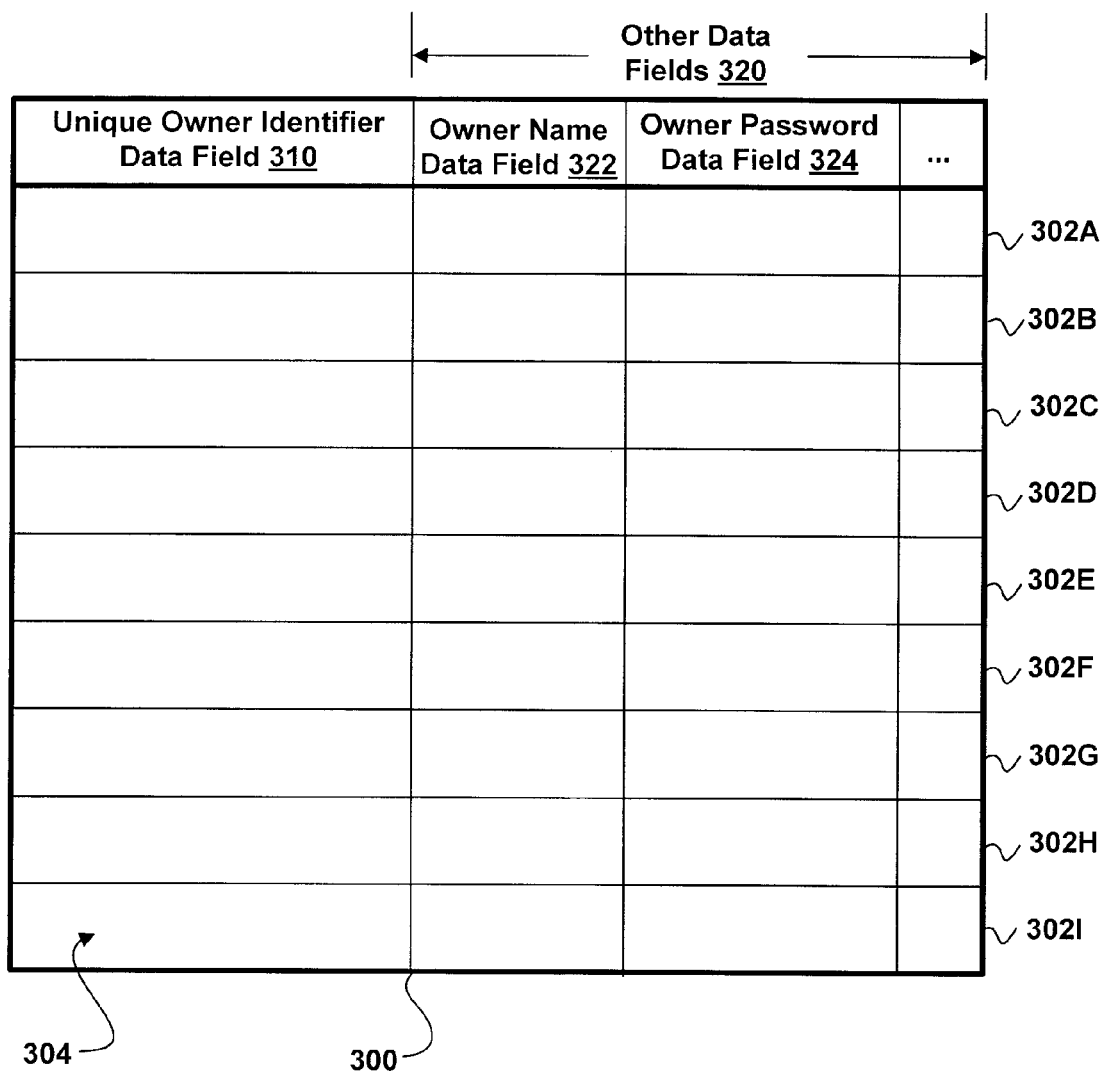
FIG. 3 illustrates an owner list data structure.

FIG. 3 shows one aspect of the invention, an owner list data structure 300 of data owner list 205, which includes a plurality of data records 302 (rows) and typically includes more data records 302 than are illustrated in FIG. 3. Each data record 302 includes several data fields 304, including a unique owner identifier data field 310 of which the contents are required to be unique with respect to all other data records 302, and can therefore be used to index and uniquely reference any particular data record 302 within the namespace of RDBMS 210. Thus, unique owner identifier data field 310 is a primary key for owner list data structure 300. Owner list data structure 300 optionally includes other data fields 320.

In another aspect of the invention, users and owners are considered identical and other data fields 320 include an owner name data field 322 and an owner password data field 324. In this case, user list 208 is typically omitted from RDBMS 210. In yet another aspect of the invention, user list 208 is maintained separately from data owner list 205.

Figure 4:
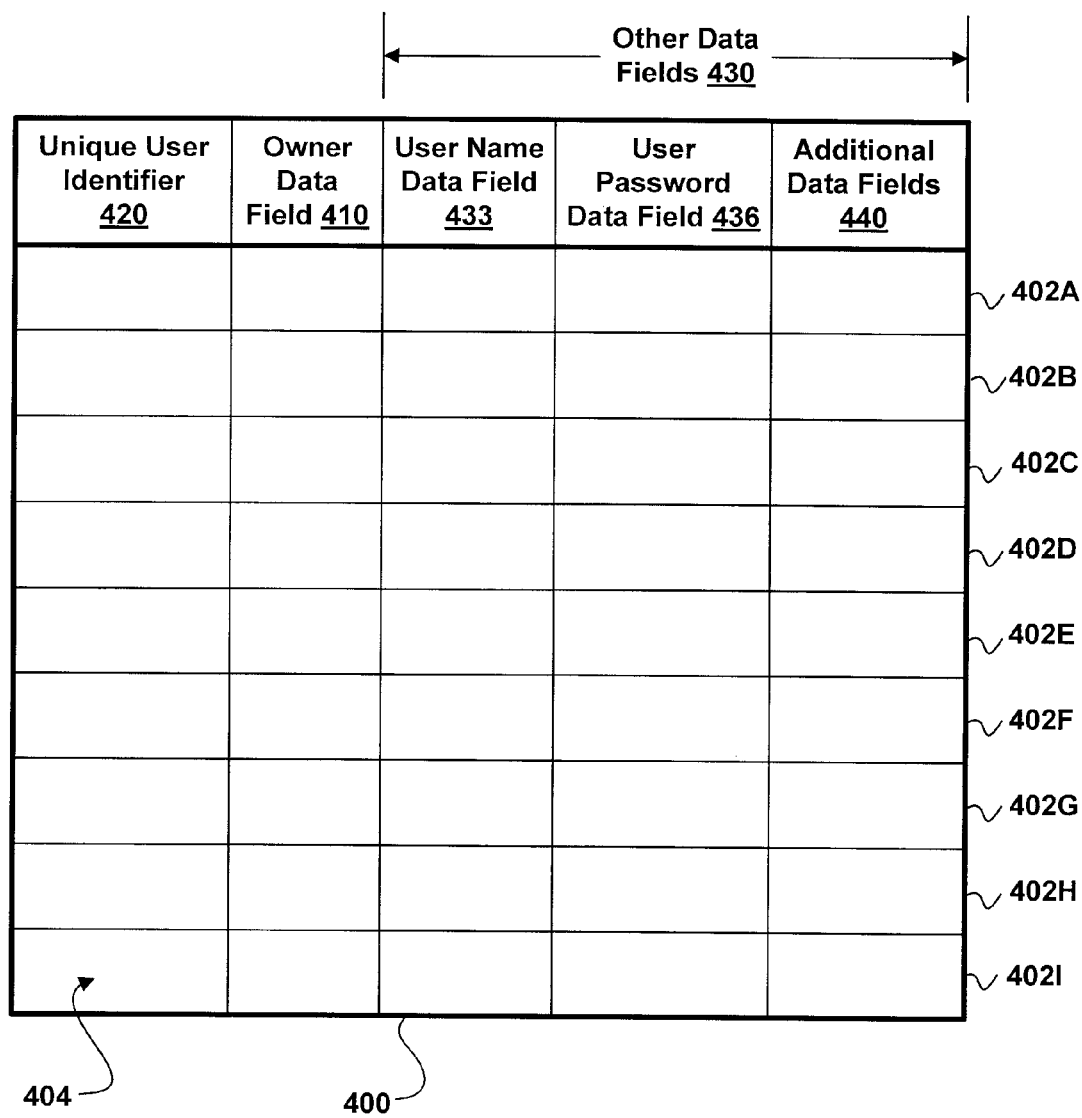
FIG. 4 illustrates a user list data structure.

FIG. 4 shows a user list data structure 400 of user list 208. User list data structure 400 includes a plurality of data records 402 (rows), typically more than in FIG. 4, each including several data fields generally designated 404. User list data structure 400 includes an owner data field 410 and a unique user identifier 425. For each data record 402, the contents of owner data field 410 are required to match the contents of unique owner identifier data field 310 in one and only one owner list data record 302. That is, owner data field 410 references unique owner identifier data record 310 as a foreign key. In addition, for each data record 402, the contents of unique user identifier data field 425 are a primary key for user list data structure 400 within the namespace of RDBMS 210. In addition, user list data structure 400 may optionally include other data fields 430 such as user name data field 433 and user password data field 436. Additional data fields 440 are optionally added to user list data structure 400 as desired.

Figure 5:
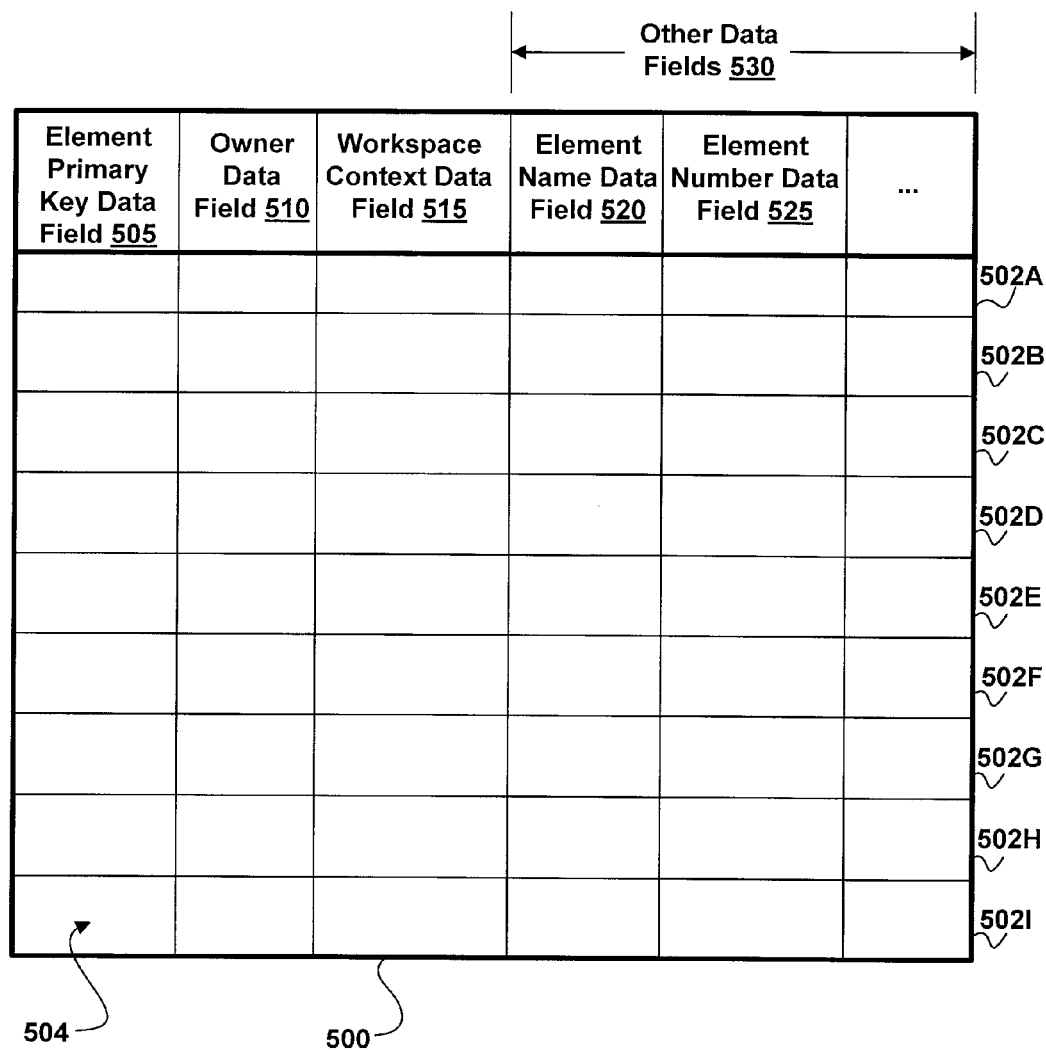
FIG. 5 is an illustration of an element list data structure.

FIG. 5 illustrates an element list data structure 500 of element list 206. Element list data structure 500 includes a plurality of data records 502 (rows) and typically includes more data records 502 than shown in FIG. 5. Each data record 502 includes several data fields generally designated 504. Element list data structure 500 includes element primary key data field 505 and owner data field 510. Element primary key data field 505 is a primary key for element list data structure 500 within the namespace of RDBMS 210. Owner data field 510 references unique owner identifier data field 310 as a foreign key. Element list data structure 500 also includes at least one other data field 530, including one of element name data field 520 or element number data field 525, and preferably both. The contents of other data fields 530 are typically created by users of the system.

In another aspect of the invention, element number data field 525 includes an element (part) number for the BOM element associated with the individual data record 502. Element name data field 520 includes further identifying information regarding the element associated with the data record 502. Element numbers and names can reference steps or operations, as well as physical elements. Typically, element list data structure 500 includes more data fields 530 than shown, which can be referred to by a variety of names such as unit of measure or price. FIG. 5 also shows optional workspace context data field 515, the purpose of which is explained below.

Element list 206 lists individual parts from at least one BOM. Examples of possible elements within element list 206 include custom mechanical operations such as injection molding, extrusion, and stamping; standard mechanical components such as fasteners and O-rings; printed circuit boards; standard electrical components such as resistors and capacitors; programmed electrical components such as ROMs and ASICs; and the like.

Multiple lists of elements from multiple BOMs associated with multiple users or companies can be combined in element list 206. Additional parameters related to each element are also stored in association within element list 206. For example, a single element can have an associated description, user and vendor part numbers, cost per item, owner including which company placed the item in the element list 206, and other information. As disclosed above, owner information is particularly important because it enables server code 200 to limit access to elements in element list 206 to owners and their designates. An owner is either a single user or an enterprise. In this disclosure, the term "user" refers to either a single user or a group of users. The subset of element list 206 owned by a user is referred to as the user's "private element list." The private element list is the subset of element list 206 within the workspace 340 of the user.

Figure 6:
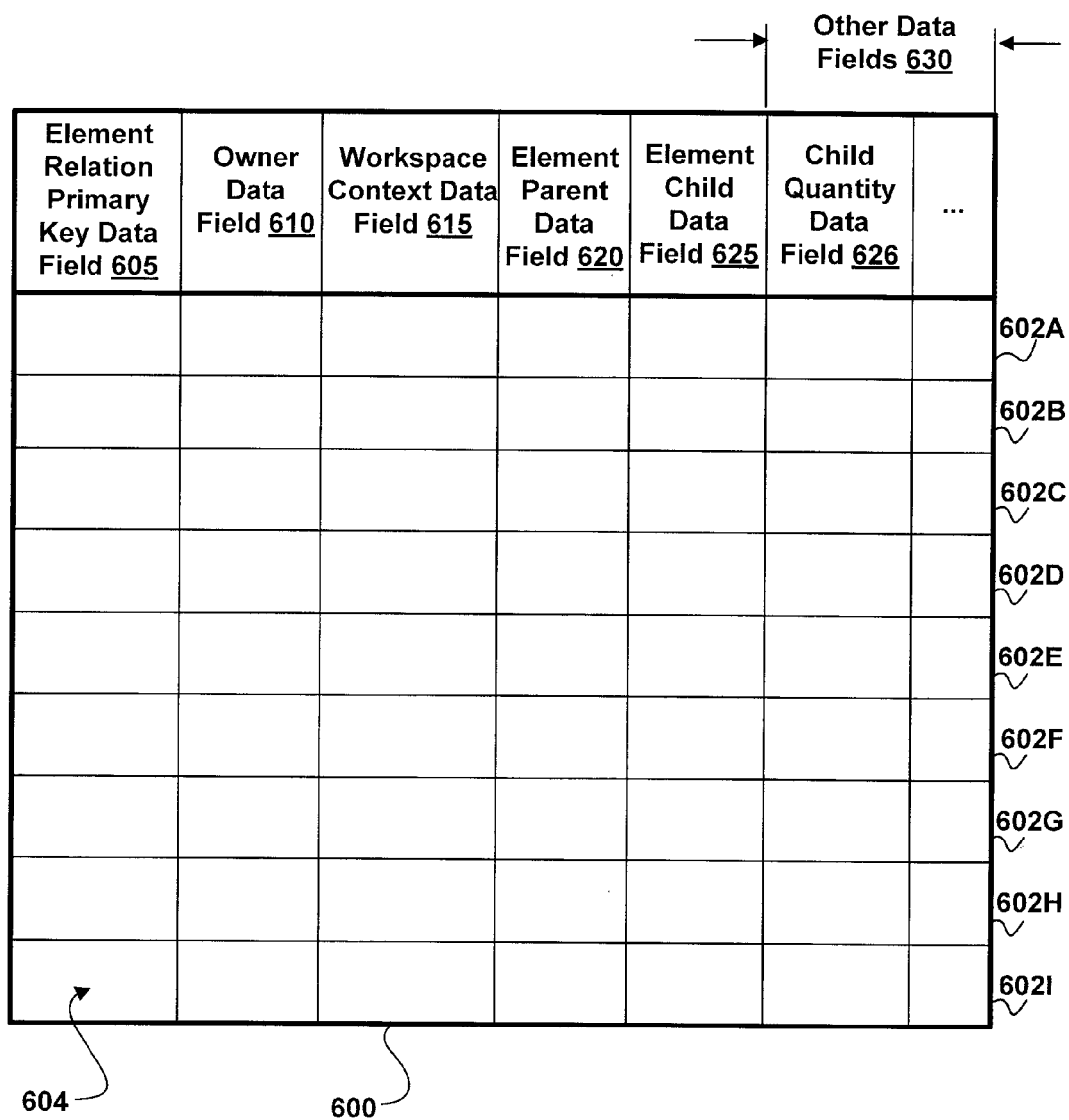
FIG. 6 is an illustration of an element relations list data structure.

FIG. 6 illustrates an element relations list data structure 600 of element relations list 207. Element relations list data structure 600 includes a plurality of data records 602 (rows) and typically includes more data records 602 than are shown in FIG. 6. Each data record 602 includes several data fields generally designated 604. Element relations list data structure 600 includes an element relation primary key data field 605, an owner data field 610, an element parent data field 620, and an element child data field 625. Element relation primary key field data field 605 is a primary key for element relation list data structure 600 within the namespace of RDBMS 210.

Owner data field 610 references unique owner identifier data field 310 as a foreign key. Element parent data field 620 references element primary key data field 505 as a foreign key. Element child data field 625 also references element primary key data field 505 as a foreign key. Element relations list data structure is used to represent BOM relationships between BOM elements represented by data records 502 in element data structure 500. For example, to show that a BOM element represented by a data record 502B is included in the bill of materials for a BOM element represented by data record 502A, a data record 602A would contain a reference to data record 502A in element parent data field 620, and a reference to data record 502B in element child data field 625. By creating one data record 602 for each BOM element included in a bill of materials, it is possible to capture structured, multi-level bill of materials relationships between BOM elements.

Various applications of this method will be apparent to those skilled in the art. For example, element relations list data structure 600 optionally includes other data fields 630 in addition to element parent data field 620 and element child data field 625. In an aspect of the invention, other data fields 630 include child quantity data field 626, which contains a number indicating how many of the child BOM elements are included in each of the parent BOM elements. The contents of other data fields 630 are preferably specified by users of the invention. Typically, element list data structure 600 will include more data fields 630 in addition to those shown. Also shown in FIG. 6 is optional workspace context data field 615, the purpose of which is explained below.

As disclosed above, element relations list 207 are data delineating the relationships between various items in element list 206. For example, a first element (or parent element) in element list 206 can include four of a second element (first child element) and two of a third element (second child element). Therefore, producing two of the first element requires the acquisition of eight of the second element and four of the third element. Element relations list 207 is optionally used to represent other relationships such as physical or electrical connectivity or assembly order. Because of the hierarchal nature of many BOMs, the structure of element list 206 can, to first order, be viewed as a tree structure with subcomponents filling branches below an element node. As discussed below this tree structure facilitates several aspects of the invention.

Figure 7:
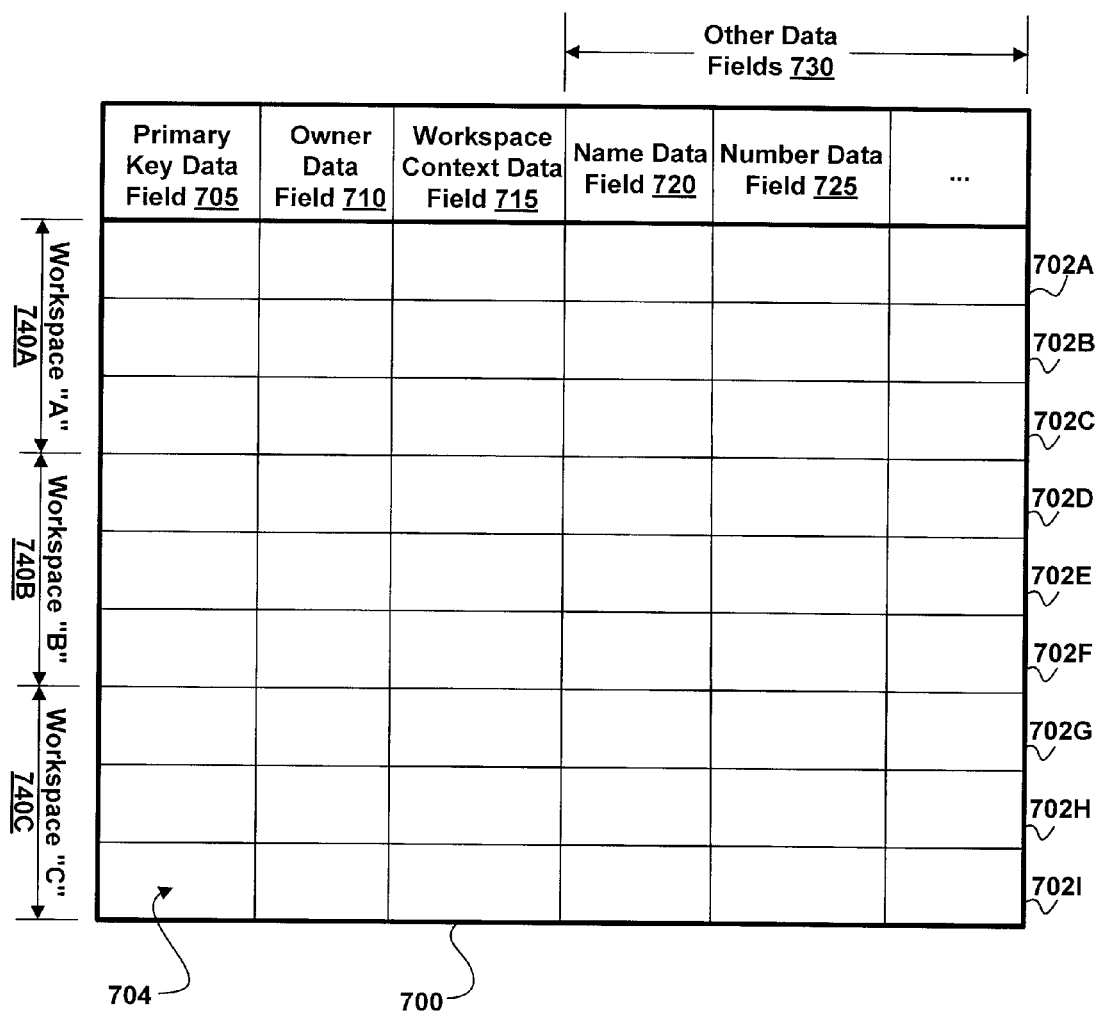
FIG. 7 illustrates a generalized data structure.

FIG. 7 is an illustration of a generalized data structure 700 according to another aspect of the invention. Generalized data structure 700 includes a plurality of data records 702 (rows) and typically includes more data records 702 than are shown in FIG. 7. Each data record 702 includes several data fields generally designated 704. Generalized data structure 700 includes a primary key data field 705 and an owner data field 710. Primary key data field 705 is a primary key for generalized data structure 700 within the namespace of RDBMS 210. Owner data field 710 references unique owner identifier data field 310 as a foreign key. At least one other data field 730 is required. Other data field 730 contains data owned by the user or data owner indicated in owner data field 710. In one aspect, generalized data structure 700 includes optional workspace context data field 715. In another aspect, generalized data structure 700 is used to store all data within memory 104 that is owned by an entity represented in data owner list 205. Both element list 206 and element relations list 207 are specific examples of generalized data structure 700.

In another aspect of the invention, server code 200 permits access to RDBMS 210 only to users represented in user list 208. In yet another aspect, server code 200 permits access to RDBMS 210 only to users represented in data owner list 205. For each user permitted to access RDBMS 210, server code 200 identifies data owners represented in data owner list 205 for which the user has been granted access rights. In one aspect, a user referenced by a particular data record 402 in user list data structure 400 is granted access by application code 200 to all data stored in various instances of generalized data structure 700 for which the contents of the owner data field 710 in generalized data structure 700 match the contents of the user's named owner data field 410 in user list data structure 400. In other aspects, server code 200 uses a more complex algorithm to determine a list of one or more data owners represented in data owner list 205 for which a user represented in user list 208 has been granted access rights (the user's access list).

Server code 200 interacts with RDBMS 210 to restrict users to viewing and editing data stored in generalized data structure 700 for which the data owner referenced in owner data field 710 is included in the user's access list. In addition, when a user creates a new data record 702 in any particular instance of generalized data structure 700, server code 200 interacts with RDBMS 210 to automatically set the contents of owner data field 710. In another aspect, the contents of owner data field 710 are set to match the contents of the user's named owner data field 410 in user list data structure 400. In other aspects, server code 200 uses a more complex algorithm to set the contents of owner data field 710.

Optional data fields 704 are designated workspace context data field 715, element name data field 720, and other data fields 730. There can be a plurality of other data fields 730.

In another aspect of the invention data records 702 of generalized data structure 700 are grouped by owner data field 710. The set of data records with a common owner is considered that owner's workspace 740. FIG. 7 shows data records 702A, 702B, and 702C as being included in a workspace "A" 740A. Likewise, data records 302D through 702I are divided between workspace "B" 740B and workspace "C" 740C. Each of these workspaces 740 typically has a different owner. Owners have control of rights and preferences within their workspaces 740. They can delegate rights, add records, and delete records. Owners determine what information within their workspace 740 is available to other users and owners. The division of BOM data into individual private workspaces 740 under a single namespace enables significant utility.

Generalized data structure 700 is optionally used within many of the lists and files in RDBMS 210 and is not restricted to use with data that includes BOM elements. For example, in various aspect of the invention, generalized data structure 700 is used to facilitate the storage of vendor lists, shipment lists, transaction lists, and other data related to various aspects of the invention. In these aspects element number data field 752 can be replaced by alternative identifying fields. For example, when generalized data structure 700 is used to facilitate the storage of a vendor list element, number data field 725 can be replaced by a vendor number data field.

Inclusion of an owner data field in generalized data structure 700 enables the aggregation of data from multiple owners, within a single namespace, in each list in which generalized data structure 700 is incorporated. An owner's workspace 740 can include any of these aggregations and can reside in files storing BOM elements, vendors, transactions, and/or other related data.

Optional workspace context data fields 715 in generalized data structure 700 are used to store data indicating the context in which other data within the data record 702 is to be interpreted. For example, it is common for two different users to use different element numbers for the same BOM element. In one aspect data within the workspace context field 715 identifies a user whose element number is used in the element number data field 725. This user can be different from the user that owns the record 702 that includes the element number data field 725. The ability to define context enables owners to make proxy representations of data owned by others. Element numbers can be aliased to reconcile differences in element numbers used by different parties.

Figure 8:
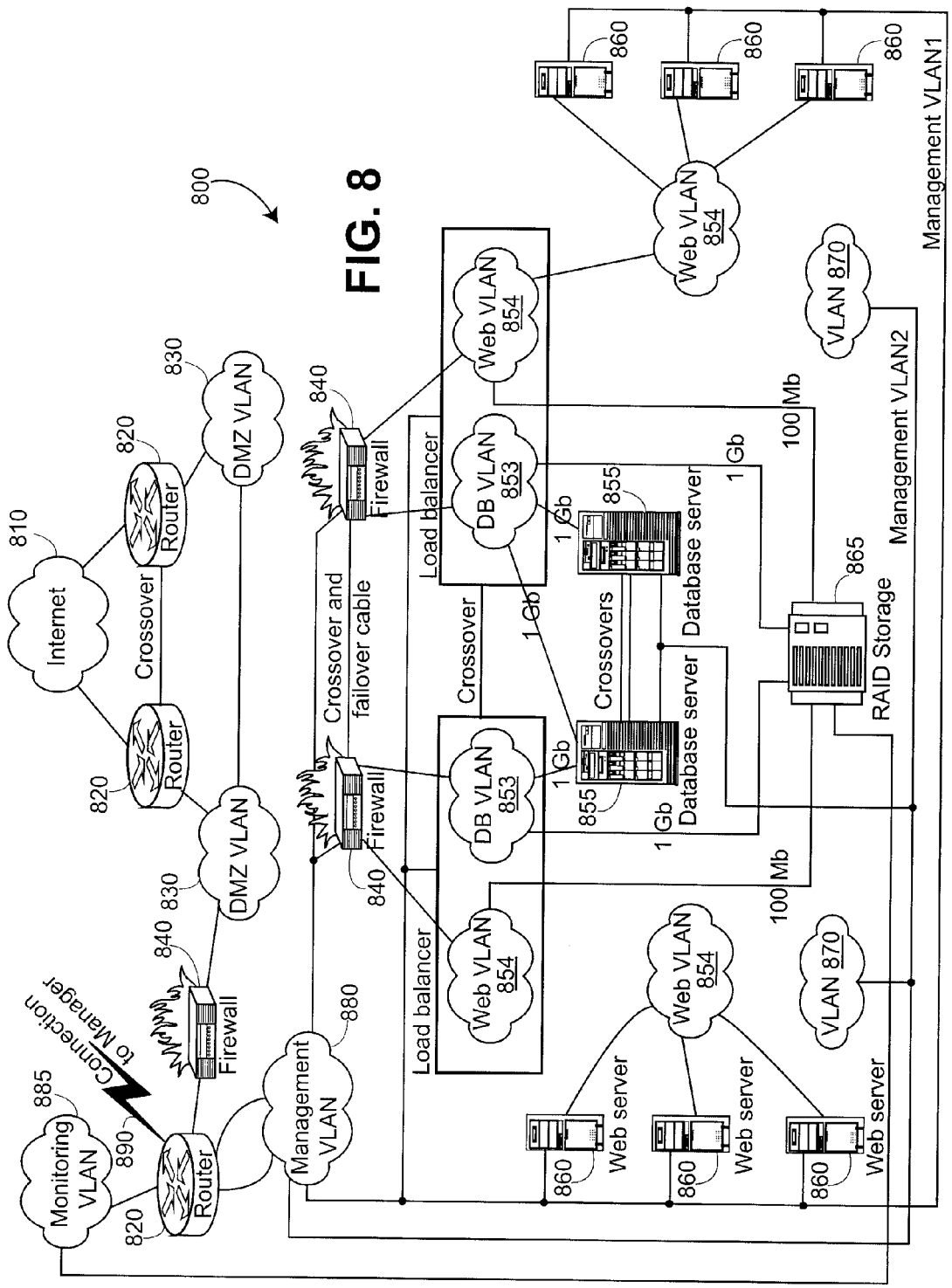
FIG. 8 illustrates a distributed system.

The system and method of the invention may alternatively be practiced in a distributed system, generally designated 800 as shown in FIG. 8. The distributed system includes the internet 810, routers 820, demilitarized zone virtual LANs (DMZ VLAN) 830, firewalls 840, load balancers 850, database (DB) VLANs 853, Web VLANs 854, database servers 855, web servers 860, RAID storage 865, VLANs 870, a management VLAN 880, a monitoring VLAN, and a connection to a managing entity 890. Various elements are disposed in a mirrored and redundant architecture. Monitoring VLAN 885 and Management VLAN provide control of the distributed system 800.

Elements within RDBMS modules 215 are alternatively stored separately or combined in a variety of data structures. RDBMS 210 optionally includes a distributed database system and may be located on distributed system 800.

Figure 9:
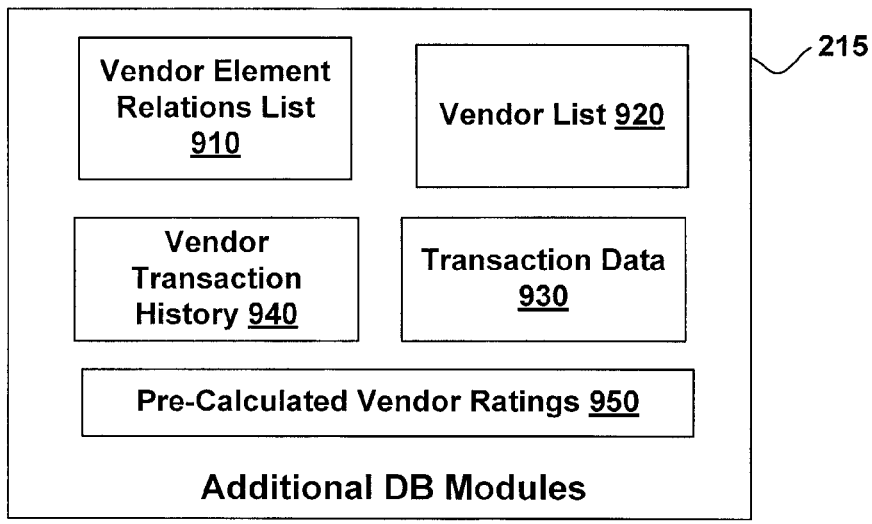
FIG. 9 is block diagram illustrating RDBMS modules.

FIG. 9 is block diagram illustrating an aspect of optional RDBMS modules 215. RDBMS modules 215 optionally include a vendor list 920, an optional vendor element relations list 910, optional transaction data 930, optional vendor transaction history 940, and optional pre-calculated vendor ratings 950. RDBMS modules 215 typically require one or more of data owner list 205, element list 206, element relations list 207, and user list 208 for proper function. In one aspect of the invention, vendor list 920 is a subset of data owner list 205. In another aspect, vendor list 920 is maintained separately from data owner list 205.

Vendor list 920 includes data related to vendors for elements in element list 206. Vendor list 920 also optionally includes, for each vendor, vendor identification data such as vendor name, vendor contact information, and vendor identification number. Vendor element relations list 910 includes data delineating which vendors, of vendor list 920, supply BOM elements of element list 206. Vendor element relations list 910 is optionally further qualified by the quantity of each element that the referenced vendor can supply. For example, a vendor is able to supply up to 1,000 of an element per month with a minimum order of 500 units. In contrast, a second vendor is willing to supply lower quantities, perhaps for use in the conceptual or design phases of a user's product. Further, a third vendor is a manufacturer and has the ability to deliver vast quantities of the element. Vendor element relations list 910 optionally includes, for each vendor element relation, such data. In addition, vendors are typically resellers that resell elements in lower quantities, or manufacturers producing an element and supplying it directly to a client. Vendor element relations list 910 optionally includes, for each vendor element relation, data indicating whether the vendor is a reseller or a manufacturer.

User list 208 optionally includes data to associate a subset of users with a vendor in vendor list 920. According to this aspect, server code 200 uses this data in conjunction with vendor element relations list 910 to permit users associated with a vendor to access elements in element list 206 supplied by said vendor. Users typically enter vendor element relationships in order to facilitate future purchasing of an item. Using previously entered vendor element relationships to permit users associated with a vendor to gain access to BOM elements and related BOM data provides significant utility. In particular, there is a substantial reduction in the amount of work required to administer access to BOM data. In addition, the timeliness and accuracy of the shared data is improved, because the vendor's users gain automated access to the most current BOM data stored in the system.

Transaction data 930 includes information used to support transactions. An aspect of vendor transaction history 940 lists the number of each transaction type completed for each vendor. Each time an electronic transaction as described below is completed, the vendor transaction history 940 is updated with a record of the transaction. Optionally, pre-calculated vendor ratings 950 contain summaries of the data, such as timeliness and reliability, for vendors in vendor list 920. Pre-calculated vendor ratings 950 are alternatively automatically updated at pre-established intervals or whenever a user requests a vendor rating.

Figure 10:
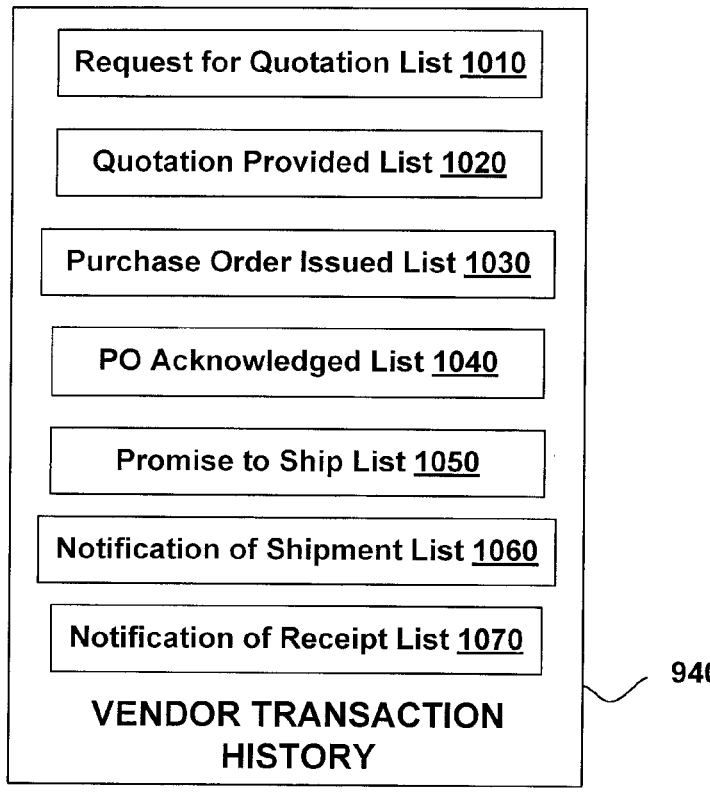
FIG. 10 is a block diagram illustrating optional elements of a vendor transaction history.

FIG. 10 is a block diagram showing optional elements of vendor transaction history 940. These elements include a request for quotation list 1010, a quotation provided list 1020, a purchase order ("PO") issued list 1030, a PO acknowledgment list 1040, a promise to ship list 1050, a notification of shipment list 1060, and a notification of receipt list 1070. In an aspect, each time a transaction is completed a relevant list in vendor transaction history 940 is updated.

Figure 11:
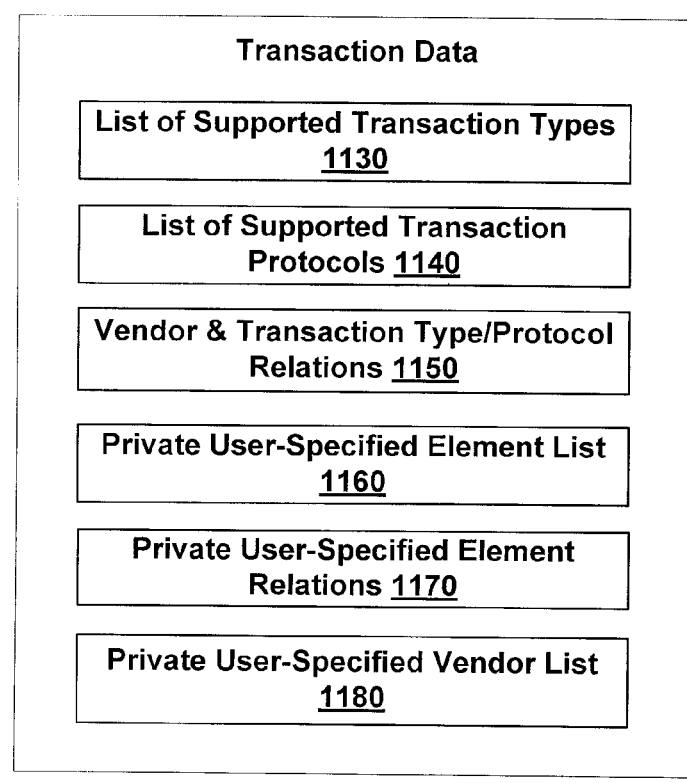
FIG. 11 is a block diagram illustrating elements of transaction data.

FIG. 11 is a block diagram illustrating elements of transaction data 930. These include a list of supported transaction types 1130, a list of supported transaction protocols 1140, vendor and transaction type/protocol relations 1150, a private user-specified element list 1160, private user-specified element relations 1170, and a private user-specified vendor list 1180.

List of supported transaction types 1130 includes transaction types such as element availability inquiries (queries regarding whether a vendor carries an element), manufacturer availability (queries regarding whether a vendor carries elements from a specific manufacturer), quantity of elements "available to promise" (items in stock and unordered), price request for a specific quantity of items, price schedule as a function of quantity, lead time request for a specific quantity, lead time as a function of quantity, requests for quotation, quotation provided (from vendor to user), purchase order issued (user to vendor), PO acknowledged (vendor to user), promise to ship (vendor to user), notification of shipment (vendor to user), notification of receipt (user to vendor), and the like.

List of supported transaction protocols 1140 includes transaction protocols such as Rosetta Net or EDI, fax, e-mail, e-mail containing the URL of a web form for entering vendor response, postal mail interface, manual protocols such as telephone calls (voice), and the like. These protocols are implemented by systems 100 and 800 and associated with interfaces described below and with reference to FIG. 18.

Vendor and transaction type/protocol relations 1150, include a list of vendors and vendor protocols associated with items in element list 206. The vendor and transaction type/protocol relations 1150 include the vendors that can supply an item and which protocol to use for each transaction type with each vendor when requesting the element.

Private user-specified element list 1160 is a subset of element list 206 with access control so that each enterprise or user can only see selected elements. The user can transfer elements to private user specified element list 1160 from element list 206, thereby eliminating the need to enter specification data for each element. In one aspect of the invention, private user-specified element list 1160 includes some elements not included in element list 206.

Private user-specified element relations 1170 includes relations that are applicable to private user-specified element list 1160. Private user-specified vendor list 1180 optionally includes a list of at least one vendor for each of the elements in private user-specified element list 1160. Private user-specified vendor list 1180 is generated by the user and is only accessible by the user or his designates. Private user-specified vendor list 1180 optionally makes reference to vendors listed in vendor list 920 and optionally includes new or unknown vendors.

Figure 12:
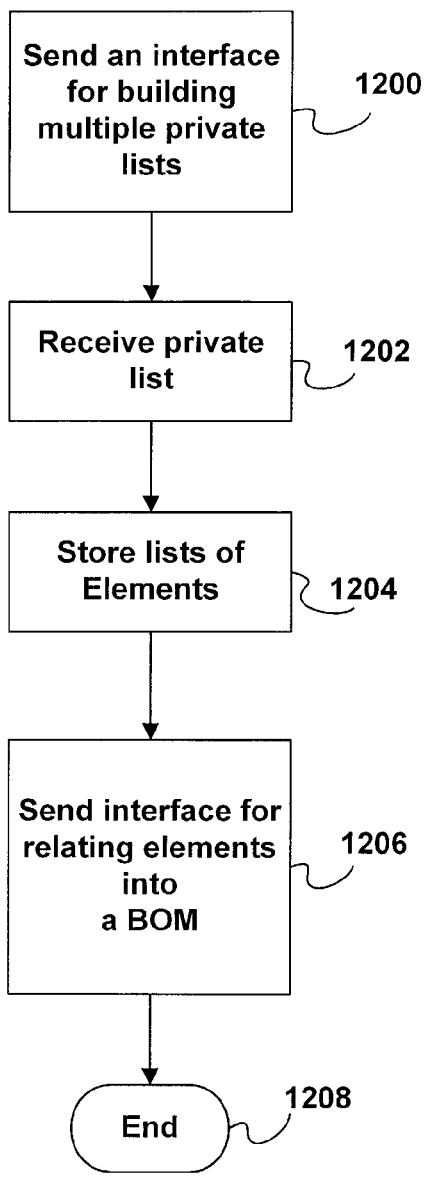
FIG. 12 is a flowchart of steps according to an aspect of the invention for creating and storing a BOM in an RDBMS.

FIG. 12 is a flowchart of steps according to an aspect of the invention for creating and storing a BOM in RDBMS 210. At a step 1200 server code 200 sends to a user via a computer network such as the World Wide Web, an interface for building multiple private lists of uniquely identified purchasable or non-purchasable elements. Non-purchasable elements include, for example, a test point on a printed circuit board or manufacturing step. The user displays and operates the interface on a remote computer via web browser software such as Netscape Navigator® and Microsoft Internet Explorer®, or other conventional method.

At a step 1202, server code 200 receives from the user at least one private user specified element list 1160 of uniquely identified elements, the elements' attributes, and the elements' relationships to each other. The elements include processes, mechanical or electrical components, or any other uniquely identifiable element required for the building of a product. Attributes or properties of the elements include quantity of the element required to produce a product or subassembly, part number, and description.

At a step 1204, RDBMS 210 stores any or all of the elements within private user-specified element list 1160 and their attributes in element list 206. RDBMS 210 stores relations between the elements (such as parent-child relationships) in element list 206. Further, RDBMS 210 stores vendor and/or manufacturer information for each element in vendor list 920. In addition, elements from multiple BOMs from multiple users are stored together in the element list 206. These users may "own" BOMs or workspaces 340 comprised of private user specified element lists and, through ownership, control access to and manipulation of data within those BOMs. For example, multiple companies can add elements in element list 206 while only those elements introduced by a specific user are preferably edited by that user. The user can provide a variety of access privileges to other users such as other employees of the same enterprise.

At a step 1206, server code 200 sends an interface to a user via the Internet, or similar communications means, for relating elements from element list 206 into a private user specified element list 1160 or private BOM. In one aspect the user builds and accesses a list of public elements that are accessible by all users and incorporates and relates those public elements into a private BOM. The BOM is presented as a fully nested view with user-selectable expansion of subassemblies/ levels. Further, the BOM is expandable down to a specified level or alternatively only a specific level can be viewed. The interface also allows flattened and component viewing. At a step 1208, the method terminates. Vendors optionally provide elements to element list 206 for public access. The user-specified element list 1160 or private BOM can be loaded into the workspace 340 of the user within element list 206.

Figure 13:
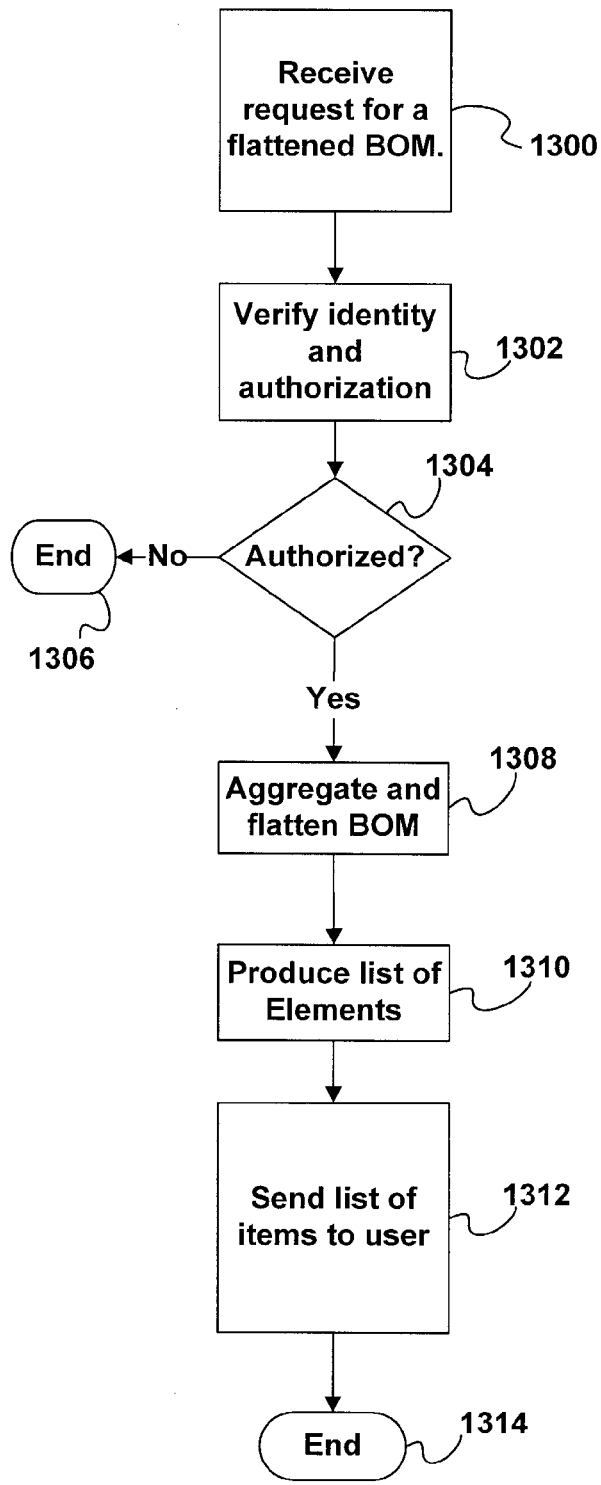
FIG. 13 is a flowchart of steps according to an aspect of the invention for sending an aggregated and flattened BOM to a user.

FIG. 13 is a flowchart of steps according to an aspect of the invention for sending an aggregated and flattened BOMs to an enterprise. Flattening a BOM is similar to removing the structural and relational information. After flattening, a BOM is shown as a list of parts without visualization of parent-child relationships. Aggregation of a BOM involves collection and counting of identical elements. For example, if a part is used four times in a BOM it may have four separate entries in a non-aggregated view. However, in an aggregated view these parts may be referenced once with a "quantity" descriptor equal to four. Flattening and aggregation may be applied to a subset of a BOM. The operations may also be performed to support pre-computed views.

At a step 1300, server code 200 receives a request from a user to send a flattened BOM. At a step 1302, server code 200 optionally verifies the user's authority to access the BOM that he has requested. At a step 1304, server code 200 verifies the user's authorization by confirming that a user-entered password matches the password listed in user/enterprise list 205. Alternatively, server code 200 verifies the user's authorization via any other well-known means for confirming identity such as fingerprint matching or retinal scanning. If the user is not authorized to access the BOM, the method ends at a step 1306. Alternatively, the user is prompted to reenter his or her password. Further, the user is locked out of the BOM if he fails to enter the correct password multiple times in a pre-specified time period.

If the user is authorized to access the requested BOM, then at a step 1308 the RDBMS 210 aggregates and flattens the user's BOM. RDBMS 210 identifies which items in element list 206 are parts of the user's BOM (workspace 340) by accessing the owner data field 310 associated with each element. At a step 1310, RDBMS produces a list of BOM elements that include the aggregated and flattened BOM data. This list may be divided by or limited to purchasable or non-purchasable elements. At a step 1312, server code 210 sends the list to the user and the process ends at a step 1314.

The unique collection of multiple BOMs, preferably from multiple users, organizations, or companies within a single system and the relationships among elements, enables several aspects of the invention. These include automated development of vendor lists, enhanced calculation of system costs, improved element classification, vendor ratings, electronic transaction processing, and targeted advertising based on elements within a BOMs. These aspects are disclosed in detail below.

Development of Vendor Lists

In another aspect of the invention, element list 206 is used to generate primary or alternative vendor lists. Since element list 206 includes data submitted by a plurality of users, when a user selects an element for inclusion within their own BOM there is a possibility that the same element has already included in a BOM owned by a party other than the user. Computer code operating within system 100 disaggregates multiple BOM owned by multiple users into individual elements, remove proprietary information, and then compiles the non-proprietary information into a database of element sources. The database of element sources allows computer code operating within system 100 to recommend sources for elements when a user creates a new BOM. Sourcing recommendations are keyed by manufacturer name, vendor name, part number, or the like.

Sourcing recommendations are further enabled by a BOM possibly having multiple interchangeable sources for each line element within the BOMs. A user can indicate one vendor of an individual element as the "preferred" source, and maintain information about other "alternative" vendors in case the preferred sources are unable to meet the requirements of the user.

The source recommendation method is implemented in a database, such as RDBMS 210, that contains lists of purchasable elements from multiple users or companies in a single namespace. In this database, if enterprise A has an element for which a single source is known, it is possible to search the database for elements owned by other companies that have the same source, and if any such elements exist, to determine what other sources have been specified by the alternative companies. These alternative sources can then be returned to enterprise A as suggested alternative sources without revealing the identity or any other information about the other companies or users.

Figure 14:
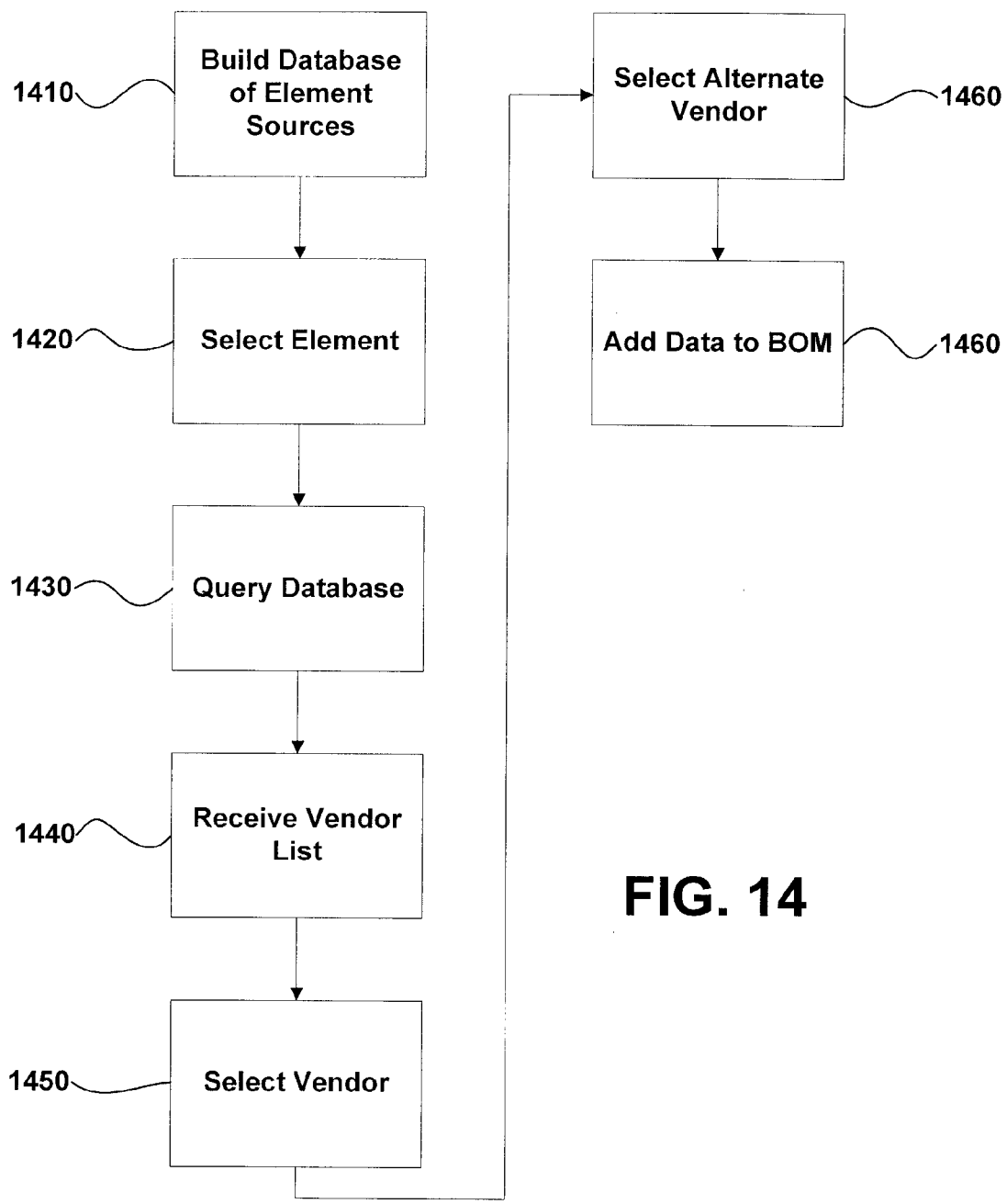
FIG. 14 illustrates steps in an aspect of the invention for developing and using vendor lists.

FIG. 14 illustrates steps in the development and use of vendor lists. In a step 1410 the vendor-element data in element list 206 is used to build a database of element sources. In a step 1420, which occurs before or after step 1410, a user selects an element. In a step 1430 the database developed in step 1410 is queried to find the selected element and returns any available vendor information. This information is generated by the user, other users, or by vendors. In a step 1440 the user receives the results of the query including a vendor list. In a step 1450 the user selects a preferred vendors for the chosen element. In a step 1460 the user optionally selects secondary vendors for the element. In a step 1470 the selections are added to the workspace of the user.

Calculation of System Costs

Figure 15:
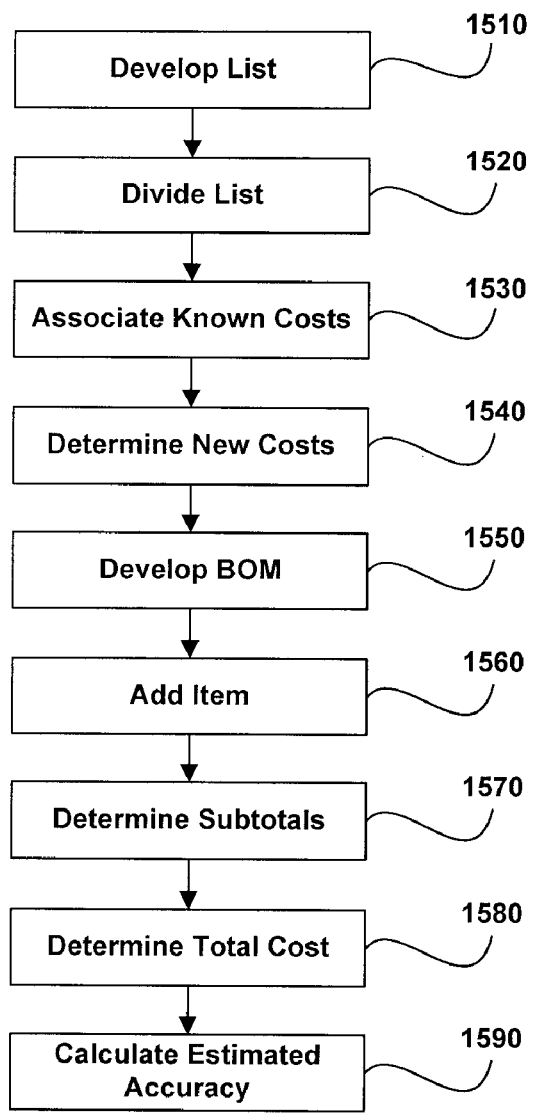
FIG. 15 illustrates steps for determining a cost estimate from the content of a BOM.

In an aspect of the invention data within RDBMS 210 is used for automatically calculating a product cost estimate and a figure of merit for this calculation. One method of determining a "rolled up" product cost estimate and calculating the accuracy of the estimate based on a preliminary BOM is illustrated in FIG. 15.

In a step 1510 a list of purchasable or non-purchasable elements to be included in a BOM is developed. This list is generated as one or more BOMs are populated. In a step 1520, the list developed in step 1510 is divided into elements that are already used by the user and newly specified elements. The division occurs as the list is developed or at the request of the user, and the division is optionally updated over time as more elements are introduced or changed. Throughout this process elements having a known, quoted, or estimated cost are tagged as such. In a step 1530, for each element already used by the user, cost information from previous purchasing records are automatically associated with the element. In a step 1540 a cost estimation or price quotation is attained for each newly specified element. Users select to have quotation requests automatically generated and sent to appropriate vendors. In an optional step 1550 a new BOM is developed and in a step 1360 an element is added to the new BOM or a previously existing BOM. Cost estimates are for single or multiple element quantities. Steps 1550 and 1560 are not necessarily performed immediately proceeding steps 1510 through 1540.

In a step 1570 three separate cost subtotals are calculated for the selected BOM, the subtotal of the elements with estimated costs, the subtotal of the elements with quoted costs, and the subtotal of the elements with known costs. Alternatively, these values are maintained in running subtotals. A count of the quantity of elements in each category is optionally maintained. In a step 1580 the total cost estimate is determined by adding the three subtotals.

In a step 1590 figures of merit for the accuracy of the cost estimates are calculated from the values generated in steps 1570 and 1580 or from values generated through a similar process. At a minimum, these include the percentage of the total cost represented by the estimated, quoted, and known cost subtotals, or the percentage of the total number of elements in each cost category. The perceived accuracy of individual price estimates may be considered in an algorithm used to calculate the accuracy of estimated total costs. The calculated figures of merit are optionally reported to a user.

Element Classification

In another aspect of the invention systems for simplified component type categorization and automating design analysis using said type categorizations are provided. These enable methods of multiple, application specific, hierarchical, and other types of categorizations of product components.

A table of classes or "categories" is maintained in a database, with each category represented by at least one row within the table. Categories are related to each other in a tree-like structure, wherein each category is a parent to none, one or more child categories or elements (components). Individual categories and elements are also children to none, one, or more parent categories. The relationships between categories in this system are structurally similar to assemblies in BOMs and in an aspect of the invention, the table of categories is combined with an element table (BOM) as a single table in a database. In another aspect two separate tables are maintained, one of categories and another of components. The relationship between the parent and children categories and components are maintained as a "parent category" column in the category and element table(s), or in a separate "category relation" table which minimally includes a column for the child category or component and a column for the parent category or component. In this aspect, each categorization scheme has one "top-level" category, which typically signifies a "generic" categorization. The top-level category is a parent to multiple sub-categories that typically signify broad levels of categorization, such as "mechanical", "electrical", or "document". Each sub-category is a parent in turn to further sub-categories that represent subsets of the parent category. This structure is repeated as many times as necessary to reach the desired level of detail in the categorization scheme. Typically, the deepest level of category in the tree is parent to individual elements (components) that belong to that category.

According to this aspect, a user who needs to categorize a particular known element can find the appropriate category in any scheme by starting with the top-level category. The user determines which sub-category applies most closely to the element, and then move on to the further sub-categories of that sub-category. At each level in the categorization tree, if no sub-category applies to the element, the user creates a new sub-category or assigns the element to the current category. Thus, a user need not memorize the details of any particular categorization scheme, and a non-technical person can successfully categorize a well-described element. Also, the categorization scheme can be extended as new elements are added. In some aspects, users also have the ability to edit the category descriptions, to "move" components individually or in a group to a new category, to delete categories, and to merge categories.

In another aspect of the invention a method for automatically analyzing the content of one or more bills of material by component type is provided. This method permits analysis using different categorization schemes and at different levels of detail within each categorization scheme. For example, a user can query the database to calculate the cost subtotals by category for all components contained in a bill of materials at any level in the categorization tree. A product manager can look at the subtotals at the top level of the tree in order to understand how the product cost was divided between electrical and mechanical components. An electrical engineer can look at the subtotals for only the electrical sub-categories to see how the product cost was divided between passive components, active components, and connectors. A salesperson can develop a completely different categorization scheme based on target markets and use it to analyze product offerings by target market. The owner of system 100 can develop a categorization scheme that is independent of any user's schemes and employ the independent scheme to guide the placement of targeted advertising.

Replace "data fields 530" with "other data fields 630" pg 21 line 1

In another aspect of this method, parameters and default values for each parameter are assigned to a category and, as in other class based schemes, the parameter and value is "inherited" by components belonging to that category or any level of sub-category of that category. For example, the user can assign a "package" parameter with a value of "unspecified" to the category of "Electrical Components", and a "resistance" parameter with a value of "unspecified" to the category of "0603 Surface Mount Resistors". Further, the user can specify that the value of the "package" parameter for 0603 Surface Mount Resistors was "0603". Whenever a component is added to the "0603 Surface Mount Resistors" category, "package" and "resistance" parameters are automatically assigned to the component, and the "package" parameter is automatically given the value of "0603".

Vendor Rating

Figure 16:
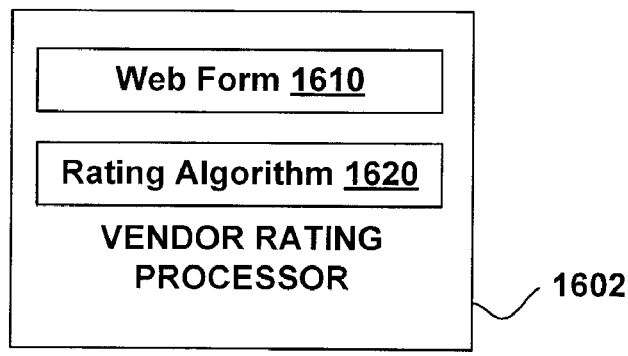
FIG. 16 is a block diagram illustrating elements included in a vendor rating processor.

FIG. 16 is a block diagram showing elements comprising a vendor rating processor 1602, including a web form 1610 and a rating algorithm 1620. Vendor rating processor 1602 is optionally located on system 100. Vendor rating processor 1602 sends web form 1610 to a user interested in inquiring on vendor ratings. Vendor rating processor 1602 uses rating algorithms 1620 to calculate vendor ratings.

Vendor rating processor 1602 calculates vendor ratings by comparing data between two or more of the lists in vendor transaction history 940. For example, vendor rating processor 1602 calculates vendor responsiveness to requests for quotations (timeliness) by comparing, over multiple transactions, the dates of requests for quotations and their subsequent quotations provided as detailed in request for quotation list 1010 and quotation provided list 1020. Vendor rating processor 1602 also calculates the percentage of vendor quotations that result in sales by calculating how often a purchase order is issued, as shown in the purchase order issued list 1030, for each quotation provided, as shown in the quotation provided list 1020.

Vendor rating processor 1602 calculates vendor responsiveness to POs (timeliness) by comparing the dates between POs issued, as recorded in the purchase order issued list 1030, and the respective POs acknowledged, as recorded in the PO Acknowledged list 1040; or between the dates of the POs issued, as recorded in purchase order issued list 1030, and the respective promises to ship, as shown in the promise to ship list 1050. Vendor rating processor 1602 calculates vendor reliability by comparing, over multiple transactions, the dates between promises to ship, as recorded in promise to ship list 1050, and the respective notifications of shipment, as recorded in notification of shipment list 1060.

Vendor rating processor 1602 calculates how many transactions a vendor has completed using system 100 by summing the transactions for the vendor stored in the multiple lists of vendor transaction history 940. For vendors with a sufficient volume of transactions, vendor processor 1602 illustrates vendor performance over time in an appropriate graph. For example, transaction processor 1602 displays vendor reliability over time so users could see whether a previously reliable vendor is currently extending delivery dates.

Figure 17:
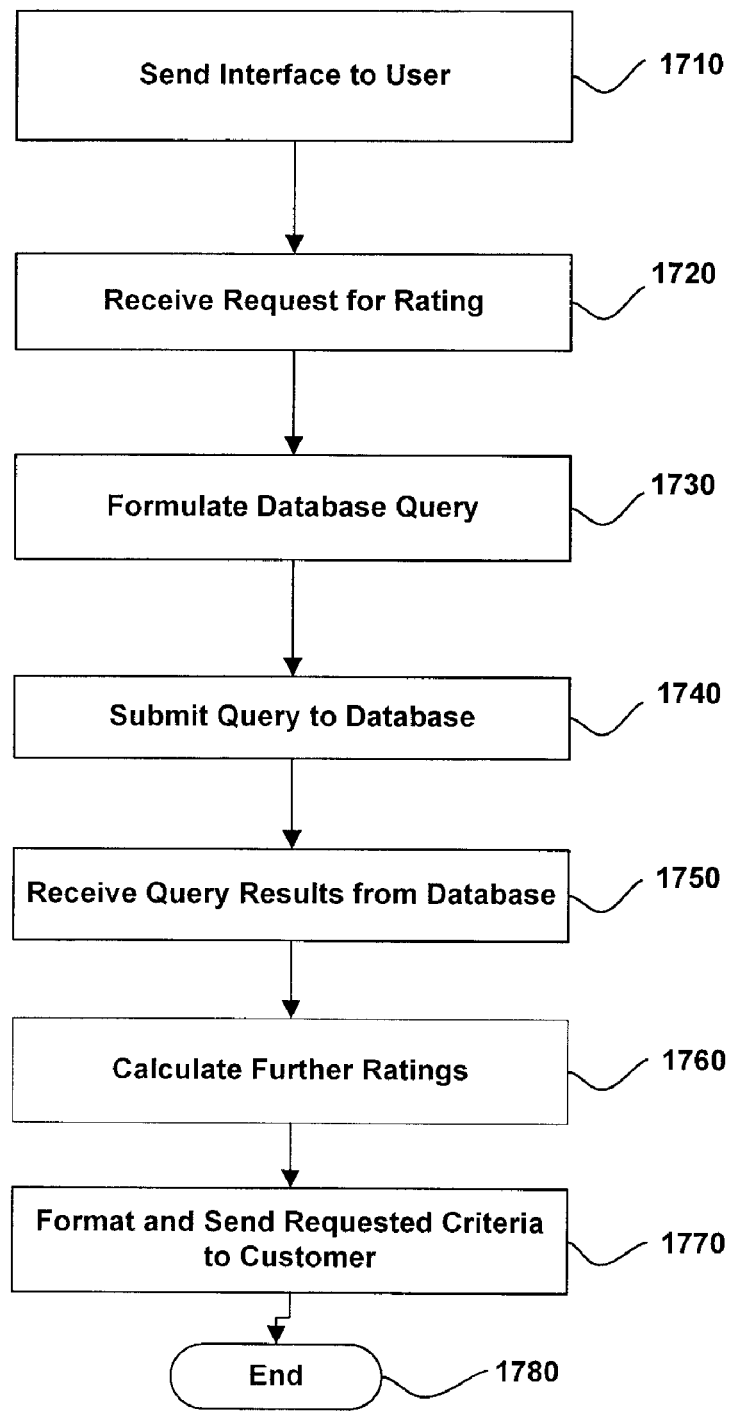
FIG. 17 is a flowchart of a method for generating a vendor rating for a vendor.

FIG. 17 is a flowchart of a method according to another aspect of the invention for generating, in real time, a vendor rating for a vendor. At a step 1710, vendor rating processor 1602, via server code 200, sends an interface, such as web form 1610, to a user. The interface allows the user to inquire regarding vendor ratings in categories such as vendor responsiveness to requests for quotations and vendor reliability. Alternatively, transaction processor 1602 allows a user to inquire about manufacturer ratings. For example, transaction processor 1602 calculates how often a manufacturer's element is the preferred component in a multi-source element, how many other users of system 100 specify the same element from the same manufacturer, how often a manufacturer is single-sourced on a particular element, for how many total elements a manufacturer is specified, and the like.

At a step 1720, vendor rating processor 1602 receives a request for one or more vendor or manufacturer rating criteria from a user. At a step 1730, vendor rating processor 1602 formulates a database query to retrieve the data from vendor transaction history 940 that is necessary for calculating the user-specified vendor rating or alternatively to retrieve pre-calculated vendor ratings 950. However, if the user requests a manufacturer rating, vendor rating processor 1602 can also formulate a database query to retrieve data from element list 206.

At a step 1740, vendor rating processor 1602 submits the database query to RDBMS 210, which, in turn, searches vendor transaction history 940 or pre-calculated vendor ratings (or element list 206 in the case of manufacturer ratings) for the appropriate data. At a step 1750, vendor rating processor 1602 receives the results of the database query and at an optional step 1760 calculates any further performance criteria/vendor ratings (or manufacturer ratings) based on the results of the query. As discussed above in conjunction with FIG. 16, vendor rating processor 1602 calculates vendor responsiveness to requests for quotations, vendor quotation conversion, vendor responsiveness to POs, vendor reliability by comparing dates between the appropriate lists for multiple transactions as stored in vendor transaction history 940, and the like. In addition, vendor rating processor 1602 provides a user with information regarding how many transactions a vendor has completed using system 100. For vendors with a sufficient volume of transactions, vendor rating processor 1602 also correlates and presents vendor performance over time in an appropriate graph.

At a step 1770, vendor rating processor 1602 formats and sends the requested performance criteria to the user via server code 200. The performance criteria are optionally presented graphically such as in x-y charts, pie charts, and color-coding results for a multiple-vendor query. Further, transaction processor 1602 provides multiple vendor ratings for multiple vendors in a single display for the purpose of vendor comparison. At a step 1780, the method ends.

Electronic Transaction Processing

Figure 18:
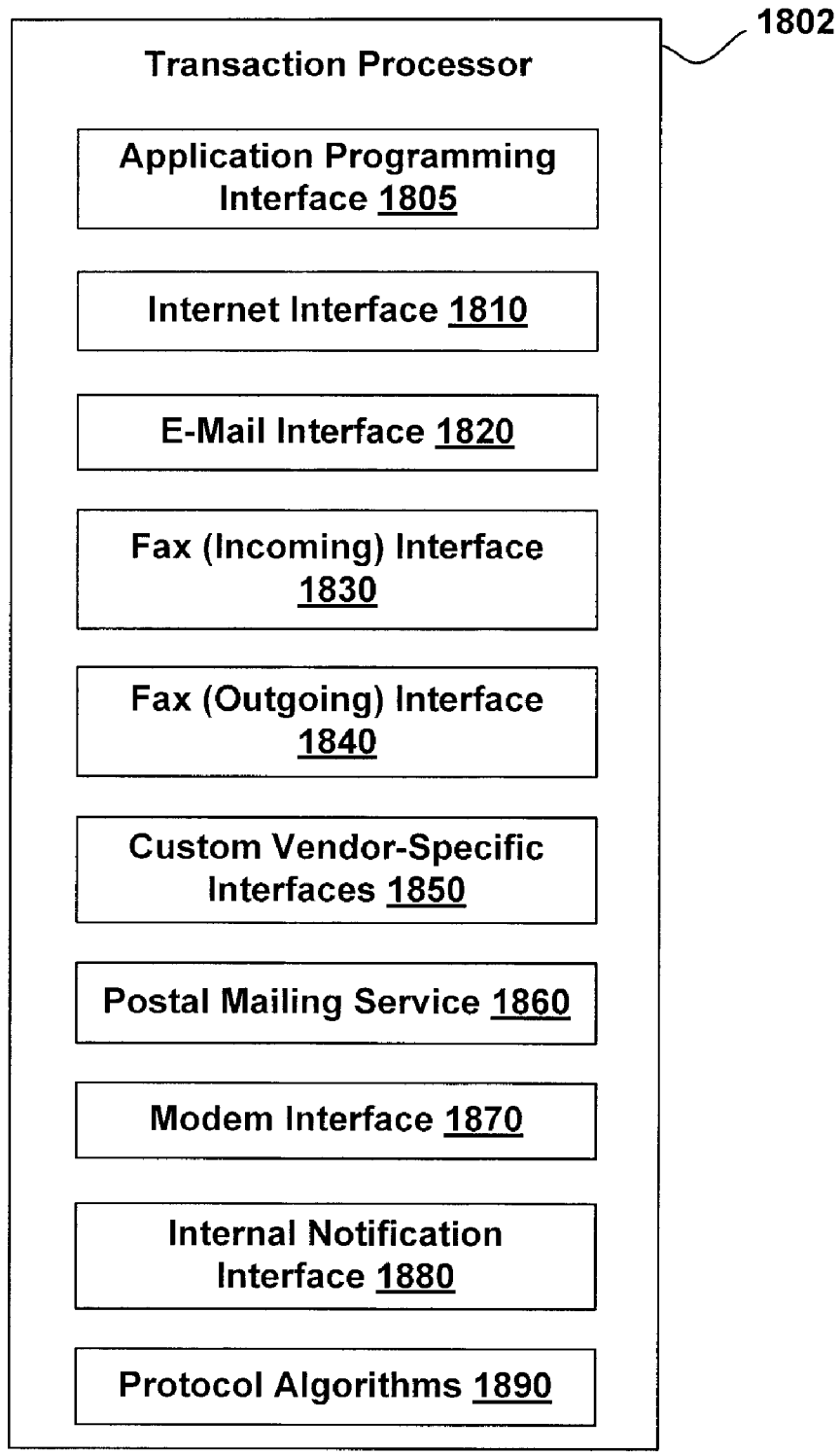
FIG. 18 is a block diagram illustrating a transaction processor.

FIG. 18 is a block diagram illustrating the transaction processor 1802. Transaction processor 1802 can be included in system 100 and includes at least one of the following digital interfaces; application programming interface 1805; Internet interface 1810; e-mail interface 1820; fax (incoming) interface 1830; fax (outgoing) interface 1840; custom vendor-specific interfaces 1850; postal mailing service 1860; modem interface 1870; and internal notification interface 1880.

Transaction processor 1802 also includes protocol algorithms 1890 that employs the interfaces contained in transaction processor 1802.

Transaction processor 1802 sends a web form from Internet interface 1810 to a user. The user employs the web form to send to system 100 an electronic transaction request. Transaction processor 1802 also sends a second web form or the like to a vendor. The vendor employs the second web form to initiate an electronic transaction request such as responding to a request for quotation. Alternatively, a user obtains or programs custom software to connect to system 100 by way of an interface such as Internet interface 1810. In this case, the user software uses the application programming interface 1805 to generate electronic transaction requests. If the user desires, such transaction requests may be initiated and executed entirely automatically, without human intervention.

The interfaces shown in FIG. 18 are all used by transaction processor 1802 to perform electronic transactions as requested by a user. When transaction processor 1802 is unable to complete an electronic transaction, transaction processor 1802 sends a notification to a human operator via notification interface 1850.

Figure 19:
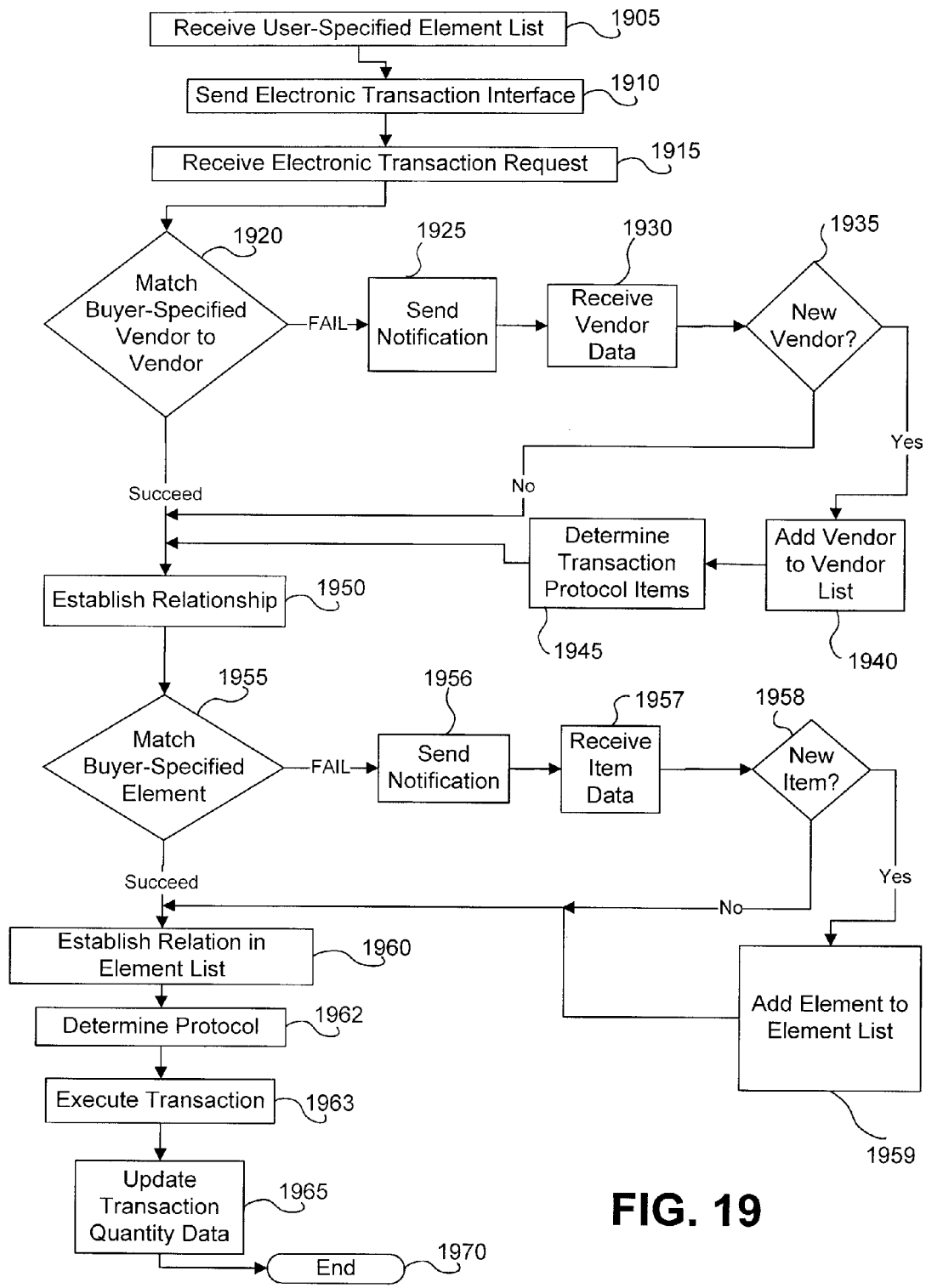
FIG. 19 is a flowchart illustrating an aspect of the invention for generating a transparent electronic transaction.

FIG. 19 is a flowchart illustrating an aspect of the invention for generating a transparent electronic transaction. In a step 1905, server code 200 receives private user-specified element list 1160 as well as associated data such as private user-specified element relations 1170 and private user-specified vendor list 1180. These lists may be derived from the workspace 340 of the user in RDBMS modules 215.

In a step 1910, transaction processor 1802, in conjunction with server code 200, sends a web form to a user so that the user can initiate a transparent electronic transaction of a type listed in supported transaction types 1130 based on an element or elements stored in private user-specified element list 1160. A vendor can also initiate an electronic transaction, such as acknowledgement of a PO. In a step 1915, transaction processor 1802, via server code 200 or similar digital interface, receives an electronic transaction request from a user. The electronic transaction request can include information such as the type of transaction to be initiated, the vendor with which to initiate the transaction, and the element to be ordered or inquired about. In addition, if the user-initiated request involves a user-designed element, the request includes design data to further define the element. Different transaction types require a variety of different information. For example, a specific "issue PO for a printed circuit board" transaction requires the user to supply the vendor with certain circuit board design data before the user can initiate the transaction. Alternatively, some transaction types do not require that a specific purchasable element be specified by the user but instead require the user to supply the vendor with descriptive parameters for a particular type of component. Then either system 100 or the vendor resolves the descriptive parameters into one or more particular purchasable or non-purchasable elements as part of the execution of the transaction.

System 100 optionally supports a variety of protocols for vendor-initiated transactions. For example, system 100 enables the user to specify that they prefer to receive vendor-initiated transactions through transaction processor 1802. In this case, the vendor initiates a transaction through one of a variety of protocols supported by transaction processor 1802 (as listed in supported transaction protocols 1140) and has that transaction appear to the user as an electronically generated transaction.

In a step 1920, transaction processor 1802 attempts to match the specified vendor as indicated in the electronic request to a vendor in vendor list 920 via automated means such as matching vendor contact information. Alternatively, the electronic transaction request specifies a specific vendor from vendor list 920 and, therefore, step 1920 is skipped.

If transaction processor 1802 cannot match the specified vendor to a vendor in vendor list 920, then transaction processor 1802 optionally notifies a human or automated operator of system 100, via notification interface 1850, to manually determine if the specified vendor is listed in vendor list 920. In a step 1930, transaction processor 1802 receives the results of the operator's determination. If, in a step 1935, the operator determined that the specified vendor was a known vendor, then the method continues to a step 1950, further discussed below. If the operator determines that the new vendor is a previously unknown vendor, then in a step 1940, transaction processor 1802 adds the new vendor to vendor list 920 and initializes tracking data associated with the new vendor. In a step 1945 transaction processor 1802 determines the appropriate transaction protocols from the list of supported transaction protocols 1140 for use in executing a transaction with the new vendor and stores the protocol data for each transaction type in vendor list 920.

In a step 1950, transaction processor 1802 establishes a relationship between the vendor specified in step 1915 and a vendor in vendor list 920 for the purpose of processing future transactions. Even if the vendor specified in step 1915 is a new vendor, the transaction processor 1802 can still establish the relationship between the new vendor and a vendor in vendor list 920 because the new vendor would have been added to the vendor list 920 in step 1940.

In a step 1955, the method optionally attempts to establish a relationship (if any) between the element, or elements specified in step 1915, with elements in element list 206 for future processing of electronic transactions. If transaction processor 1802 matches the buyer-specified element to an element in the element list 206, then transaction processor 1802 continues to a step 1960 discussed below. If transaction processor 1802 is unable to establish a match, the buyer-specified element to an element in element list 206, then, in a step 1956, transaction processor 1802 notifies a human operator of system 100 via internal notification interface 1880.

In a step 1956, transaction processor 1802 receives the results from the operator's inquiry regarding matching the element. If the operator was able to match the buyer-specified element to an element in element list 206, then transaction processor 1802 proceeds to a step 1960. If the element is new (the human operator was unable to match the buyer-specified element to an item in element list 206), then in a step 1959, transaction processor 1802 adds the new item to element list 206.

In step 1960, transaction processor 1802 determines the relationship between the buyer-specified element and an item in element list 206 for the purpose of processing future transactions. In a step 1962, transaction processor 1802 determines which protocol to use for this transaction by cross-referencing the vendor and transaction type in vendor and transaction type/protocol relations 1150.

In a step 1963, transaction processor 1802 executes the transaction using the protocol selected in step 1962.

After the transaction is completed, transaction processor 1802 optionally updates transaction quantity data item in vendor list 920 for the transaction type performed. In a step 1970 the method ends.

Targeted Advertising

Categorization of elements within a user's BOM and selection of third-party part numbers by a user provides system 100 with information about the interests and activities of the user.

This information allows the manager of system 100 to display targeted advertising to the user. The manager of system 100 offers advertising space based on a user's element categorizations and part numbers. For example, if a user has elements within their private user-specified element list 1160 categorized as "electronic power supply-switch mode" they are shown advertisements related to alternative power supplies or DC-DC converters. In another example, a user has specified a part number 00-1234 from manufacturer A. Manufacturer B pays for advertisements to be shown to all users that specify part 00-1234 offering an alternative part. This permits vendors to deliver advertising to potential users that are known to be specifying a competitive compatible part and to users that are known to be interested in specific types of components. Vendors are also able to cross-sell to users who have already specified their parts. The targeted delivery of information need not be limited to advertising. For example, product updates, recall notices, and application notes can be delivered to users of specific products.

We claim:

1. A computer implemented method for storing and managing a plurality of bills of material (BOMs) comprising:
    accepting information for a plurality of BOMs, each BOM describable as a tree with each node an element, each element in each BOM having an owner of a set of more than one owner, and each BOM having an owner of the set of owners;
    storing the plurality of BOMs in a database in a processing system; and
    providing access to at least some of the information of one or more of the plurality of BOMs to one or more users according to control information, control information for providing access to a particular BOM being received from an entity that is the owner of the particular BOM and/or any entity that the owner of the BOM designates, such that the providing of further access to at least some of the information of a particular BOM is controlled by the entity that is the owner of the particular BOM and/or by any entity that the owner of the BOM designates,
    such that BOMs associated with different owners are stored in the same processing system,
    wherein for each of at least two different owners, at least one of the BOMs of the respective owner includes confidential information of the owner, such that unrestricted access to the confidential information is limited to the owner of the BOM and/or to any entity that the owner of the BOM designates; and
    wherein the different owners need not be related except that they each have information stored in the same processing system.

2. A method as recited in claim 1, wherein the BOMs are stored remotely, and wherein access to the BOMs is provided remotely.

3. A method as recited in claim 1, wherein the storing of the BOMs includes:
    storing one or more data structures in the processing system for storing the plurality of BOMs,
    the method further comprising:
        storing a list of elements in the processing system, each element in the list of elements having a unique element identifier, each element in each BOM being one of the elements in the list of elements,
    such that the list of elements and the one or more data structures are part of a database stored in the same processing system.

4. A method as recited in claim 3, further comprising:
    providing unrestricted access to any confidential information in a particular stored BOM only to the owner associated with the particular BOM and to none or more designates of the owner.

5. A method as recited in claim 3, wherein each of one or more elements in the element list is associated with a respective owner of the set of owners, and wherein the list of elements includes an indication of ownership for each element associated with one of the owners, the method further comprising:
    restricting access to information about a particular element in the element list that is associated with a particular owner to the particular owner and none or more designates of the particular owner.

6. A computer implemented method for managing a plurality of bills of material (BOMs) comprising:
    accepting information for a database, the database including:
        a list of elements, each element having a unique identifier, one or more elements of the list of elements being for inclusion in one or more of the plurality of BOMs; and
        one or more data structures for storing the plurality of BOMs, each BOM describable as a tree with each node an element of the list of elements, at least two of the BOMs being associated with different respective owners of a set of owners;
    storing the database in a processing system; and
    providing remote access to one or more elements of information in the database to one or more users according to control information, control information for providing access to elements of a particular BOM being received from an entity that is the owner of the particular BOM and/or any entity that the owner of the BOM designates, such that the providing of further access to at least some of the information of a particular BOM is controlled by the entity that is the owner of the particular BOM and/or by any entity that the owner of the BOM designates,
    such that the database is arranged to contain BOMs associated with different owners,
    wherein for each of at least two different owners, at least one of the BOMs of the respective owner includes confidential information of the owner, such that unrestricted access to the confidential information is limited to the owner of the BOM and any designates of the owner of the BOM, and
    wherein the different owners need not be related other than in that they each have information stored in the same processing system.

7. A method as recited in claim 6, wherein one or more elements in the element list are associated with a respective owner of the set of owners, and wherein the list of elements includes an indication of ownership for each element associated with one of the owners, the method further comprising:
    restricting access to information about a particular element in the element list that is associated with a particular owner to the particular owner and none or more designates of the particular owner.

8. A method as recited in claim 6, wherein the database is arranged such that a first BOM of a first owner may share one or more elements of the list of elements with a second BOM of a second owner.

9. A computer-implemented method for managing a plurality of bills of material (BOMs) comprising:
    accepting information for a database, the database including:

a list of elements, each element having a unique identifier, one or more of the elements being for inclusion in at least one of the BOMs; and one or more BOM data structures for storing the plurality of BOMs, each BOM describable as a tree with each node an element of the list of elements and each branch of the tree defining a parent-child relationship, the one or more BOM data structures storing information on the parent-child relationships of the plurality of BOMs, two or more of the BOMs associated with a respective owner of a set of owners;

storing the database in a processing system; and providing remote access to one or more elements of information in the database to one or more users according to control information, control information for providing access to elements of a particular BOM being received from an entity that is the owner of the particular BOM and/or any entity that the owner of the BOM designates, such that the providing of further access to at least some of the information of a particular BOM is controlled by the entity that is the owner of the particular BOM and/or by any entity that the owner of the BOM designates, such that the database is arranged to contain BOMs having different owners, wherein the database includes confidential information of at least two of the owners such that unrestricted access to the confidential information is limited to the respective owner of the confidential information and any designates of the owner, and wherein the different owners need not be related other than in that they each have information stored in the same processing system.

10. A method as recited in claim 9, wherein a BOM of a particular owner includes confidential information, and wherein the confidential information of the particular owner includes the BOM confidential information.

11. A method as recited in claim 9, wherein providing remote access includes providing remote access via a public network.

12. A method as recited in claim 11, wherein the public network is the Internet.

13. A method as recited in claim 9, wherein one or more elements in the element list is associated with a respective owner of the set of owners, wherein the list of elements includes an indication of ownership for each element associated with one of the owners, and wherein the confidential information of an owner that owns a element in the list of elements includes confidential information in the list of elements, such that unrestricted access to confidential information about a particular element in the element list that is associated with a particular owner is limited to the particular owner and none or more designates of the particular owner.

14. A method as recited in claim 9, wherein a first BOM of a first owner may share one or more elements of the list of elements with a second BOM of a second owner.

15. A method as recited in claim 9, wherein each element in the element list is one the set consisting of a physical element and a process, wherein the physical element may itself be a BOM and wherein the process may reference a set of steps or operations.

16. A method as recited in claim 9, wherein each BOM data structure is for storing the parent-child relationships for at least one BOM of the plurality of BOMs, and wherein a BOM data structure includes, for a particular BOM, an entry for each element in the particular BOM, said element entry including a reference to the element's entry in the list of elements, an entry indicating the owner, and an entry indicating any child of the element in the case the element has a child in the tree representing the particular BOM.

17. A method as recited in claim 16, wherein the parent child relations for all the BOMs are stored in a single BOM data structure.

* * * * *